US010767927B2

(12) United States Patent
Argyres et al.

(10) Patent No.: US 10,767,927 B2
(45) Date of Patent: Sep. 8, 2020

(54) SYSTEMS FOR INCREASED DRYING OF SPEAKER AND SENSOR COMPONENTS THAT ARE EXPOSED TO MOISTURE

(71) Applicant: Apple Inc., Cupertino, CA (US)

(72) Inventors: Brian A. Argyres, San Mateo, CA (US); Matthew A. Donarski, San Francisco, CA (US); Eric N. Nyland, Santa Clara, CA (US); Tyler B. Cater, San Jose, CA (US); Oliver Leonhardt, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 22 days.

(21) Appl. No.: 16/252,152

(22) Filed: Jan. 18, 2019

(65) Prior Publication Data
US 2020/0080775 A1 Mar. 12, 2020

Related U.S. Application Data

(60) Provisional application No. 62/728,631, filed on Sep. 7, 2018.

(51) Int. Cl.
*F26B 3/28* (2006.01)
*H04R 9/02* (2006.01)
(Continued)

(52) U.S. Cl.
CPC .............. *F26B 3/283* (2013.01); *F26B 9/003* (2013.01); *H04M 1/0202* (2013.01);
(Continued)

(58) Field of Classification Search
CPC .. F26B 3/283; F26B 9/003; F26B 9/30; F26B 9/50; F26B 21/00; F26B 21/06;
(Continued)

(56) References Cited

U.S. PATENT DOCUMENTS 6,461,125 B1 10/2002 Terasawa et al.
6,625,900 B1 9/2003 Tobias
(Continued)

FOREIGN PATENT DOCUMENTS

WO 2017149171 A1 9/2017

*Primary Examiner* — Stephen M Gravini
(74) *Attorney, Agent, or Firm* — Dickinson Wright RLLP

(57) ABSTRACT

This application relates to a portable electronic device including a processor and an operational component assembly, the operational component assembly including a frame. The frame carries a sensor that is coupled to the frame, where the sensor is capable of (i) receiving an environmental stimulus, and (ii) subsequently, generating an environmental parameter based on the environmental stimulus. The operational components further include a speaker that includes a magnetic driver that is capable of generating a magnetic field in response to receiving the instructions, and a diaphragm that is capable of actuating in response to the magnetic field being generated by the magnetic driver. An opening is disposed at an external surface of the frame such that when an amount of moisture is present within the volume, the magnetic driver receives the instructions from the processor to generate a magnetic field that actuates the diaphragm so as to expel the moisture.

20 Claims, 14 Drawing Sheets

(51) Int. Cl.
*H04M 1/02* (2006.01)
*F26B 9/00* (2006.01)
*H04R 9/06* (2006.01)
*G01L 9/00* (2006.01)

(52) U.S. Cl.
CPC .............. *H04R 9/025* (2013.01); *H04R 9/06* (2013.01); *G01L 9/0041* (2013.01)

(58) Field of Classification Search
CPC ....... H04M 1/0202; H04R 9/025; H04R 9/06; G01L 9/0041
USPC .......................................................... 34/248
See application file for complete search history.

(56) References Cited

U.S. PATENT DOCUMENTS

| | | | |
|---|---|---|---|
| 6,648,502 B2 | 11/2003 | Oomori et al. | |
| 6,975,305 B2 | 12/2005 | Yamashita | |
| 8,408,785 B2 | 4/2013 | Hiranuma | |
| 9,167,065 B2 | 10/2015 | Mikami et al. | |
| 9,683,780 B2* | 6/2017 | Zielinski | F26B 5/044 |
| 9,829,249 B2* | 11/2017 | Tice | F26B 3/04 |
| 9,841,234 B2* | 12/2017 | Stahl | F26B 15/00 |
| 9,939,783 B2 | 4/2018 | Hilario et al. | |
| 10,006,714 B2* | 6/2018 | Schmidt | F26B 3/02 |
| 10,056,205 B2* | 8/2018 | Hegde | G06F 1/1662 |
| 10,197,330 B2* | 2/2019 | Stewart | D06F 59/04 |
| 10,206,470 B2* | 2/2019 | Fathollahi | A45C 11/00 |
| 10,246,240 B1* | 4/2019 | Sadaghiani | F26B 5/00 |
| 10,327,348 B2* | 6/2019 | Wright | H01Q 7/00 |
| 10,337,794 B2* | 7/2019 | Barrows | A23B 4/031 |
| 10,345,042 B2* | 7/2019 | Mestanek | F26B 3/0923 |
| 10,436,471 B2* | 10/2019 | Williams | F26B 21/12 |
| 10,473,396 B2* | 11/2019 | Tice | F26B 5/00 |
| 10,531,586 B2 | 1/2020 | Yoon et al. | |
| 2009/0145783 A1 | 6/2009 | Forker | |
| 2014/0160680 A1 | 6/2014 | Stevens | |
| 2015/0163572 A1 | 6/2015 | Weiss et al. | |
| 2015/0293591 A1 | 10/2015 | Yairi et al. | |
| 2015/0319534 A1 | 11/2015 | Lippert et al. | |
| 2015/0331525 A1 | 11/2015 | Yairi et al. | |
| 2016/0037243 A1 | 2/2016 | Lippert et al. | |
| 2017/0086321 A1 | 3/2017 | de Jong et al. | |
| 2017/0157573 A1 | 6/2017 | Mori et al. | |
| 2018/0084324 A1 | 3/2018 | Vitt et al. | |
| 2018/0206354 A1 | 7/2018 | Yoon et al. | |
| 2019/0072903 A1 | 3/2019 | Park et al. | |
| 2019/0150754 A1 | 5/2019 | Naik et al. | |
| 2019/0383686 A1 | 12/2019 | Ten Kate et al. | |
| 2020/0025406 A1* | 1/2020 | Williams | F24F 11/72 |
| 2020/0080775 A1* | 3/2020 | Argyres | H04M 1/0202 |

\* cited by examiner

SYSTEMS FOR INCREASED DRYING OF SPEAKER AND SENSOR COMPONENTS THAT ARE EXPOSED TO MOISTURE

CROSS-REFERENCE TO RELATED APPLICATIONS

The present application claims the benefit of U.S. Provisional Application No. 62/728,631, entitled "SYSTEMS FOR INCREASED DRYING OF SPEAKER AND SENSOR COMPONENTS THAT ARE EXPOSED TO MOISTURE," filed Sep. 7, 2018, the content of which is incorporated herein by reference in its entirety for all purposes.

FIELD

The described embodiments relate generally to systems for removing moisture from an internal cavity of a portable electronic device. More particularly, the described embodiments relate to systems that utilize a speaker to increase drying of an internal cavity of a portable electronic device previously exposed to moisture.

BACKGROUND

Recently, there has been a proliferation in the number of different user functions that are capable of being executed by a portable electronic device. In particular, due to recent technological advances, many user functions which were previously only capable of being executed by dedicated electronic devices (e.g., cameras, altimeters, GPS devices, video cameras, telephones, etc.) can be presently executed by a single portable electronic device. However, these user functions suffer when the portable electronic device is exposed to moisture. Accordingly, there is a need to expedite removal of the moisture within internal cavities of the portable electronic device in order to quickly resume performing these user functions.

SUMMARY

This paper describes various embodiments that relate to systems for removing moisture from an internal cavity of a portable electronic device. More particularly, the described embodiments relate to systems that utilize a speaker to increase drying of an internal cavity of a portable electronic device previously exposed to moisture.

According to some embodiments, a portable electronic device is described. The portable electronic device includes a housing having walls that define a cavity. The housing is capable of carrying operational components within the cavity that include a processor capable of providing instructions and a moisture removal system in communication with the processor. The moisture removal system includes a sensor capable of (i) detecting an amount of moisture within the cavity, and (ii) generating a moisture parameter based on the detected amount of moisture. The moisture removal system further includes a magnetic coil element capable of generating a magnetic field in response to receiving the instructions from the processor and a diaphragm that is capable of actuating in response to the magnetic field being generated by the magnetic coil element. The moisture removal system further includes an opening disposed at an external surface of the housing, where the opening defines a passage such that when moisture is present within the cavity, the magnetic coil element receives the instructions from the processor to generate the magnetic field that causes the diaphragm to actuate so as to remove at least some of the moisture within the cavity via the passage.

According to some embodiments, a sensor assembly for a portable electronic device that includes a housing, is described. The sensory assembly includes a frame that is coupled to the housing, the frame including walls that define a cavity. The walls are capable of carrying operational components within the cavity that include a sensor module capable of (i) detecting an environmental stimulus, and (ii) generating an environmental parameter based on the detected environmental stimulus, an opening disposed at an external surface of the housing, and a bracket having sides that define a passage, where the passage fluidly connects the sensor module to the opening, and the bracket includes a moisture repelling element that is capable of repelling moisture within the cavity.

According to some embodiments, a portable electronic device is described. The portable electronic device includes a housing having walls that define a cavity, where an external surface of at least one of the walls includes an opening that extends into the cavity. The walls are capable of carrying operational components within the cavity that include a processor capable of providing instructions and a sensor in communication with the processor, where the sensor is capable of (i) determining moisture within the cavity, and (ii) providing a corresponding detection signal to the processor. The operational components further include a speaker assembly in communication with the processor, the speaker assembly including a magnetic coil capable of generating a variable magnetic field in response to receiving the instructions from the processor that are based on the corresponding detection signal, where the variable magnetic field removes at least some of the moisture present within the cavity by way of the opening.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements.

Figure 1A:
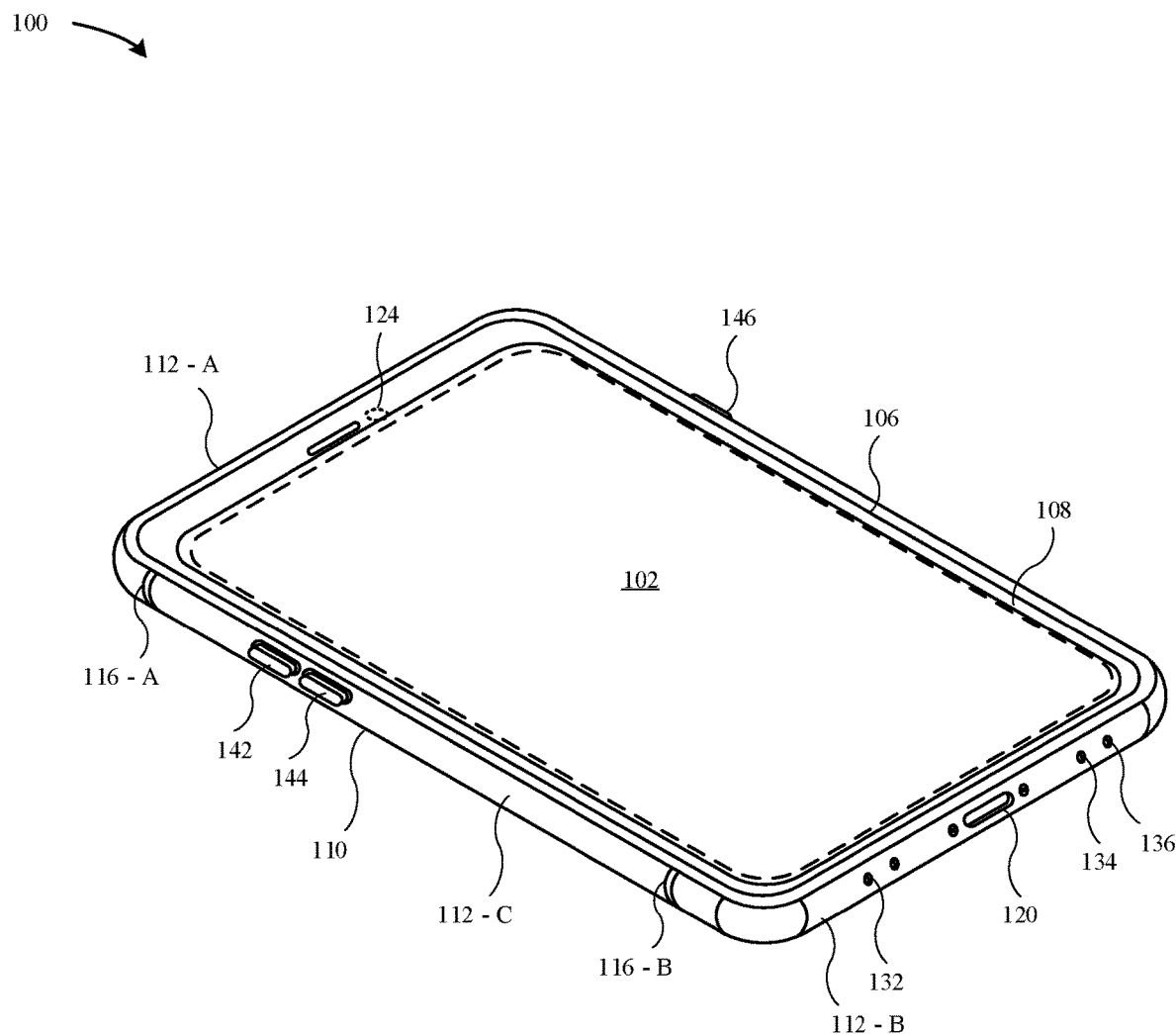
FIGS. 1A-1B illustrate perspective views of a portable electronic device that is configured to implement different aspects of the various techniques described herein, in accordance with some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments described herein relate generally to a system for increased drying of speakers and/or sensor modules that are exposed to moisture. More particular, the descried embodiments involve the system utilizing a speaker module to expel moisture from an internal cavity.

Although recent technological advances have enabled portable electronic devices to execute a number of different user functions (e.g., take photographs, determine GPS coordinates, determine altitude, capture video, place phone calls, browse the internet, etc.), these electronic devices are unable to optimally execute these different user functions when the electronic device is exposed to an inhospitable environment (e.g., a wet environment). For example, the portable electronic device may include a barometric pressure sensor. However, the barometric pressure sensor is sensitive to moisture, which can result in inaccurate sensor readings. Additionally, it would be advantageous to utilize existing operational components to expedite removal of moisture from the cavity such as to increase the accuracy of the sensor readings. Indeed, because these portable electronic devices have a limited amount of space within their internal cavities, it is generally inefficient to incorporate additional operational components having functions solely directed to removing moisture.

To cure the aforementioned deficiencies, the systems and technique described herein relate to a moisture removal system. The moisture removal system includes a speaker capable of removing moisture from within an internal cavity such as to improve sensory accuracy of a sensor. In some examples, the internal cavity is shared by the speaker and the sensor. As moisture negatively affects the accuracy of the sensor, the speaker may be utilized to remove the moisture from the internal cavity.

According to some embodiments, a portable electronic device is described. The portable electronic device includes a housing having walls that define a cavity. The housing is capable of carrying operational components within the cavity that include a processor capable of providing instructions and a moisture removal system in communication with the processor. The moisture removal system includes a sensor capable of (i) detecting an amount of moisture within the cavity, and (ii) generating a moisture parameter based on the detected amount of moisture. The moisture removal system further includes a magnetic coil element capable of generating a magnetic field in response to receiving the instructions from the processor and a diaphragm that is capable of actuating in response to the magnetic field being generated by the magnetic coil element. The moisture removal system further includes an opening disposed at an external surface of the housing, where the opening defines a passage such that when moisture is present within the cavity, the magnetic coil element receives the instructions from the processor to generate the magnetic field that causes the diaphragm to actuate so as to remove at least some of the moisture within the cavity via the passage.

These and other embodiments are discussed below with reference to FIGS. 1-9; however, those skilled in the art will readily appreciate that the detailed description given herein with respect to these figures is for explanatory purposes only and should not be construed as limiting.

Figure 1B:
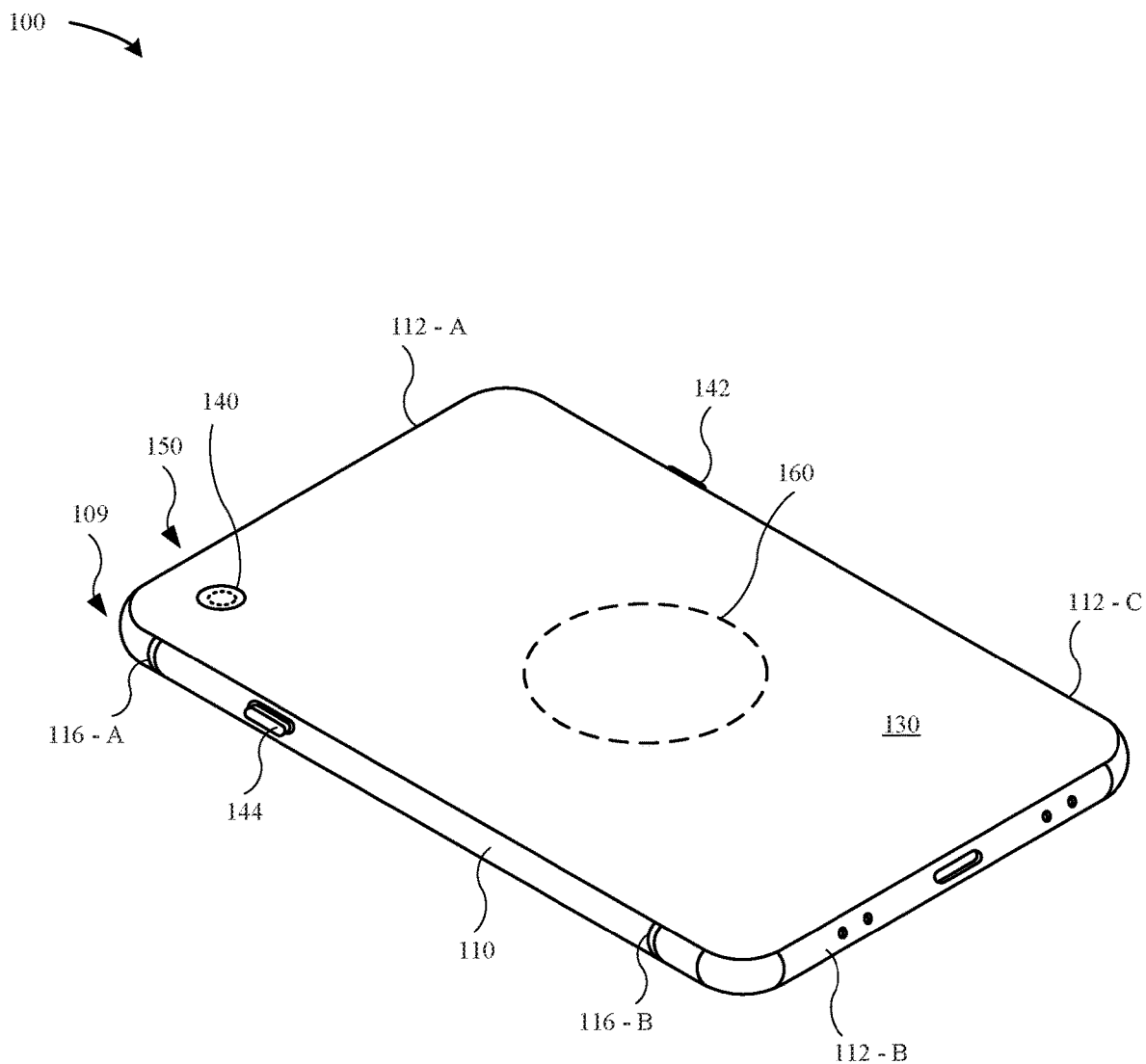

FIGS. 1A-1B illustrate a portable electronic device that includes a moisture removal system for removing moisture from an internal cavity of a portable electronic device, in accordance with some embodiments. In particular, the internal cavity may refer to at least one of a front volume, a back volume, a through-hole, or a clearance hole. In some embodiments, the drying system may include at least one operational component (e.g., a speaker module, a sensor module, etc.) that is capable of removing moisture and/or causing evaporation of moisture within the internal cavity. According to some examples, the portable electronic device can include a computing device, a smartphone, a mobile phone, a wearable consumer device, a laptop, a personal computer, a tablet, and the like. According to some examples, the moisture may refer to fresh water, saltwater, liquids, gases, steam, and the like. Although the embodiments described herein refer to the moisture removal system, the moisture removal system may also be referred to as a particulate removal system capable of removing small particles from an internal cavity that are not hydrates. For example, the particulate removal system is capable of removing dust, oils, inks, dyes, food, etc.

FIG. 1A illustrates a first perspective view of a portable electronic device 100, where the portable electronic device 100 includes an enclosure 110 having walls that define a cavity, where one or more operational components are carried within the cavity. The enclosure 110 includes a top wall 112-A, a bottom wall 112-B, and side walls 112-C. The enclosure 110 of the portable electronic device 100 can also be referred to as a housing.

FIG. 1A illustrates that the portable electronic device 100 includes a display assembly 102 that covers a majority of a top surface of the enclosure 110. The display assembly 102 can include a capacitive unit and/or a force detection unit that is capable of detecting an input at the display assembly 102 and presenting a corresponding graphical output at the display assembly 102. In some embodiments, the display assembly 102 is overlaid by a protective cover 108, where the protective cover 108 is secured with a trim structure 106. In particular, the trim structure 106 may be joined to the enclosure 110 with an attachment feature, such as an adhesive, a weld, and the like. The protective cover 108 may prevent surface abrasions and scratches from damaging the display assembly 102. The protective cover 108 may be formed from a transparent material, such as glass, plastic, sapphire, or the like.

In some embodiments, the top wall 112-A may be separated from the bottom wall 112-B by a dielectric material 116-A, B, and the side walls 112-C may be separated from the top wall 112-A and the bottom wall 112-B by the dielectric material 116-A, B. The dielectric material 116-A, B can include plastic, injection-molded plastic, polyethylene terephthalate ("PET"), polyether ether ketone ("PEEK"), ceramic, and the like. By incorporating the dielectric material 116-A, B, the walls 112-A, B, C are capable of being electrically isolated from each other.

According to some embodiments, the portable electronic device 100 includes a button 146 and switches 142, 144 that are carried along the side wall 112-C. The bottom wall 112-B includes a connector 120 that is capable of providing data and/or power to the portable electronic device 100. In some examples, the connector 120 refers to a bus and power connector. According to some embodiments, the portable electronic device 100 includes one or more electronic components 124 (e.g., infrared detector, front-facing camera, etc.) in proximity to a top wall 112-A. In some examples, the one or more electronic components 124 may be utilized for facial recognition. The bottom wall 112-B includes an opening for a speaker 134 that is capable of emitting acoustic feedback (i.e., audible sound). Additionally, the bottom wall 112-B includes an opening for at least one microphone 132 that is capable of detecting a sound effect. In some examples, the speaker 134 and the microphone 132 may be in electrical communication with each other such as to coordinate to dynamically adjust an output of the speaker 134, such as volume, duration, and the like based on the noise in the environment surrounding the portable electronic device 100. Additionally, the bottom wall 112-B may include an opening for at least one sensor module 136 that is carried within the cavity. According to some examples, the sensor module 136 may include a barometric pressure sensor, a moisture sensor, a magnetic compass, and the like. In some embodiments, at least one of the microphone 132, the speaker 134, or the sensor module 136 may share an opening. In other words, an opening at an external surface of the enclosure 110 may lead to pathways to at least one of the microphone 132, the speaker 134, or the sensor module 136.

According to some examples, at least one of the top wall 112-A, the bottom wall 112-B, or the side wall 112-C may be formed of material other than metal. Beneficially, the use of non-metal material can reduce the amount of electromagnetic interference associated with the enclosure 110 and a wireless transceiver that is carried within the enclosure 110. Additionally, the use of non-metal material reduces the amount of parasitic capacitance between any metal support structures that are carried within the cavity and the enclosure 110. According to some examples, the non-metal material includes glass, plastic, ceramic, and the like. Although non-metal material such as glass is beneficial in permitting electromagnetic waves to pass through the enclosure 110, the glass is also more susceptible than metal to cracking or deforming when the portable electronic device 100 experiences a drop event.

FIG. 1B illustrates a second perspective view of the portable electronic device 100, in accordance with some embodiments. As illustrated in FIG. 1B, a camera 150 is carried at least in part within a protruding trim structure 140. The protruding trim structure 140 is disposed in proximity to a corner 109 of the enclosure 110. As illustrated in FIG. 1B, the protruding trim structure 140 is secured to and extends from a back wall 130 of the portable electronic device 100. According to some examples, the back wall 130 is formed of a material other than metal. The non-metal material enables a magnetic field to pass through the enclosure 110 in order to charge wireless charging coils 160, such as magnetic cores that include ferrites.

According to some embodiments, the portable electronic device 100 carries one or more operational components within a cavity (not illustrated) of the portable electronic device 100. These operational components may include a circuit board, an antenna, a multi-core processor, a haptic feedback module, a camera, a sensor, an IR detector, an inductive charging coil, and the like.

Figure 2A:
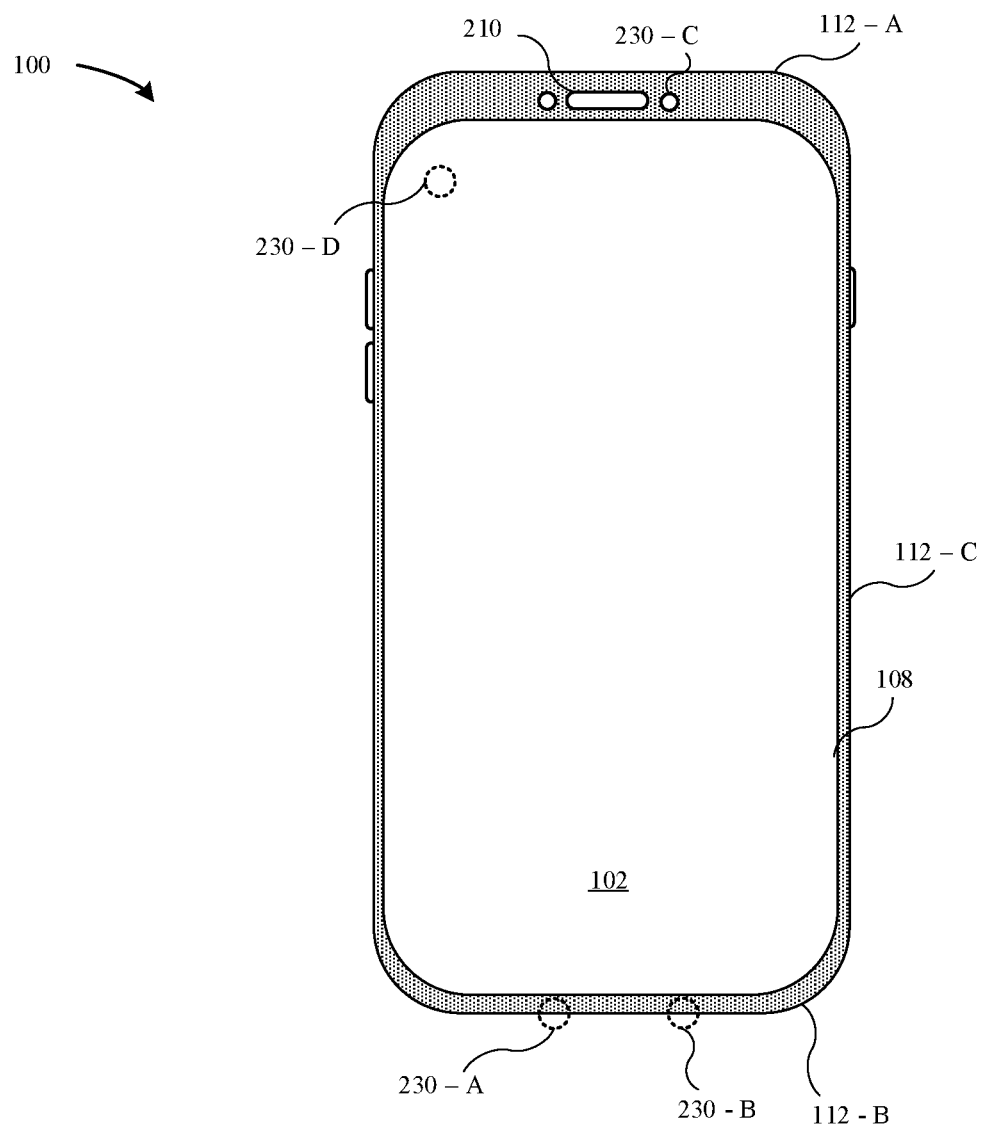
FIGS. 2A-2B illustrate various views of a portable electronic device that is configured to implement different aspects of the various techniques described herein, in accordance with some embodiments.

FIG. 2A illustrates a top view of a portable electronic device, in accordance with some embodiments. In some examples, FIG. 2A may refer to the portable electronic device 100 illustrated in FIGS. 1A-1B. As illustrated in FIG. 2A, the portable electronic device 100 includes a display assembly 102 that covers a majority of a top surface of the enclosure 110. In some embodiments, the display assembly 102 is overlaid by a protective cover 108.

The portable electronic device 100 includes multiple microphones positioned along different surfaces of the enclosure. FIG. 2A illustrates that the bottom wall 112-C includes a first microphone 230-A and a second microphone 230-B. The top wall 112-A includes a third microphone 230-C. The bottom wall 130 includes a fourth microphone 230-D. In some examples, the fourth microphone 230-D is included within the protruding trim structure 140. According to some embodiments, at least one of the microphones 230-A, B, C, or D is in communication with the speaker 210. It should be noted that because the microphones 230-A, B, C, D are disposed along different surfaces of the portable electronic device 100, it is unlikely that all of the respective openings to these microphones will become occluded when exposed to an environmental event (e.g., saltwater from a surfing session, chlorinated water from a swimming pool, etc.)

According to some embodiments, each of the aforementioned microphones may work independently or in conjunction with another to convert sound into an electrical signal. According to some embodiments, a processor (e.g., a main logic board, etc.) may provide instructions that selectively enable at least one of the microphones 230-A, B, C, or D to record sound. According to some embodiments, when respective openings for the microphones 230-A, B, C, or D becomes occluded with debris, moisture, or other particles, the processor may communicate with a sensor to determine which of the microphones 230-A, B, C, D do not satisfy a sound detection threshold. In particular, the respective diaphragms of the microphones 230-A, B, C, D may be occluded or covered with debris, moisture, or other particles that impairs functionality of converting sound into an electrical signal. In response, the processor may provide instructions to disable one or more of the microphones 230-A, B, C, or D while also providing instructions to enable one or more of the microphones 230-A, B, C, or D. Periodically, a sensor (e.g., moisture sensor, etc.) of the portable electronic device may provide a test stimulus to determine whether the respective openings to the microphones 230-A, B, C, or D satisfy a sound detection threshold level. For example, the sensor may perform an acoustic performance test on any one of the microphones 230-A, B, C, or D and provide a detection signal to the processor. In turn, the processor may enable the microphones to resume functionality if the microphone satisfies the acoustic performance test.

For example, the first and second microphones 230-A, B may be utilized as redundant microphones for a speaker phone call. When the first microphone 230-A becomes occluded, the processor may disable functionality of the first microphone 230-A until the occlusion is removed while continuing to enable functionality of the second microphone 230-B. In another example, if the first microphone 230-A and the third microphone 230-C become occluded, then the second microphone 230-B may take over for functions previously performed by the first and third microphones 230-A, C.

Figure 2B:
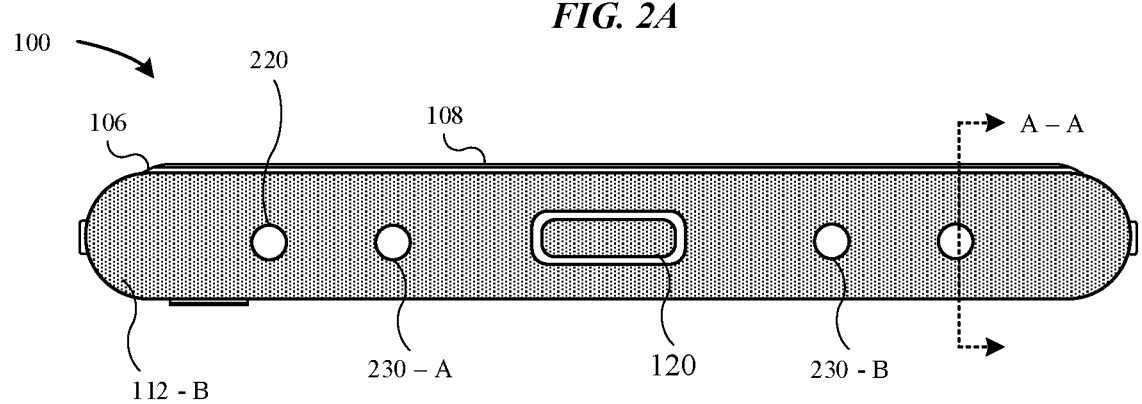

FIG. 2B illustrates a bottom view of the portable electronic device 100, in accordance with some embodiments. As illustrated in FIG. 2B, the first and second microphones 230-A, B are disposed on opposing sides of the connector 120. Openings to the first and second microphones 230-A, B are disposed at the external surface of the bottom wall 112-B. Additionally, FIG. 2B illustrates a sensor module 220 having a respective opening that is disposed at the external surface of the bottom wall 112-B.

Figure 3:
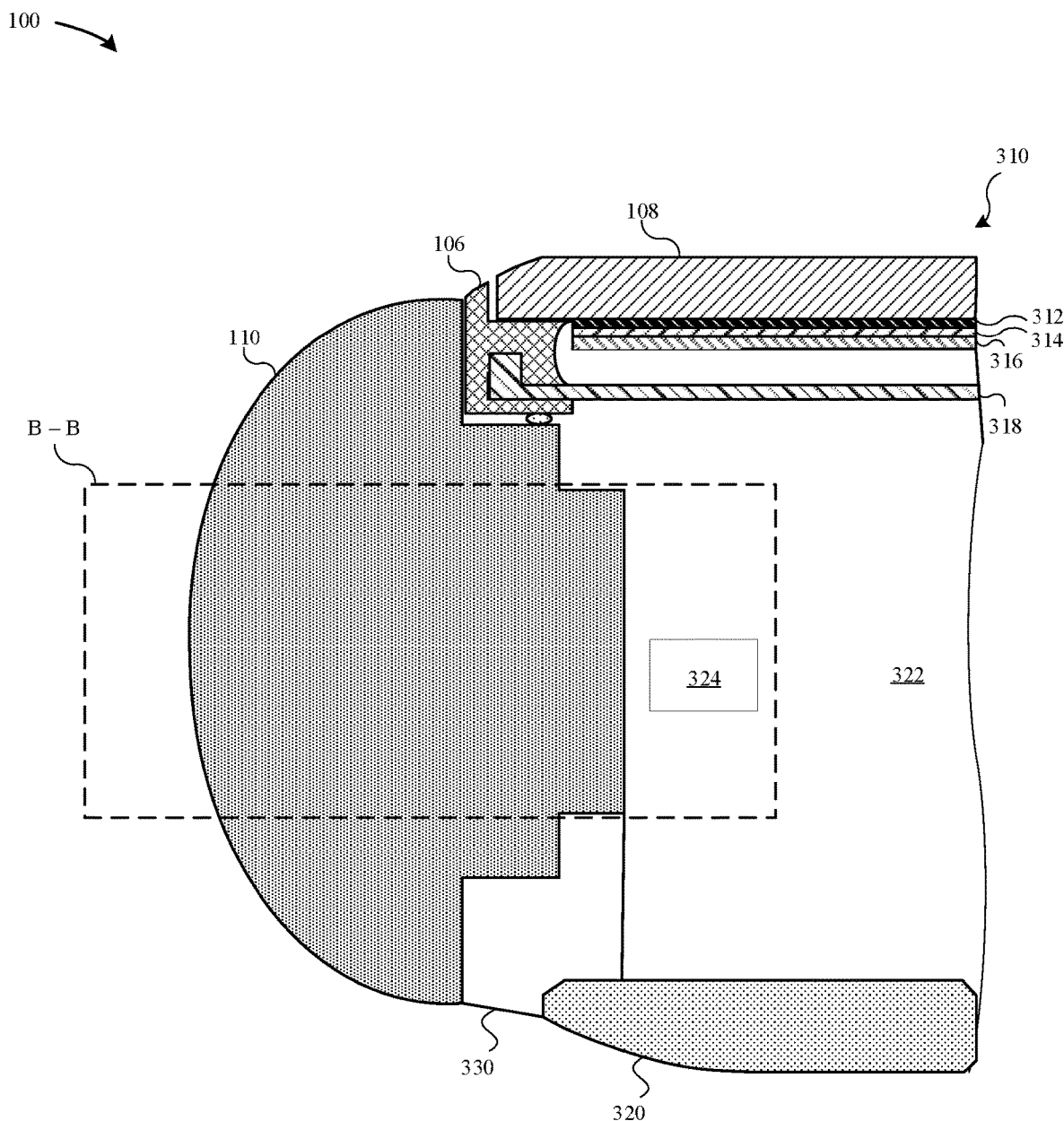
FIG. 3 illustrates a cross-sectional view of a portable electronic device that is configured to implement different aspects of the various techniques described herein, in accordance with some embodiments.

FIG. 3 illustrates a partial cross-sectional view of the portable electronic device 100, in accordance with some embodiments. In particular, FIG. 3 illustrates the portable electronic device 100 as taken along the reference line A-A of FIG. 2B, in accordance with some embodiments. FIG. 3 illustrates the portable electronic device 100 includes an enclosure 110 that carries a display assembly 310 within a cavity 322. The display assembly 310 includes a touch sensitive layer 312, a display layer 314, and a force sensitive layer 316. In some examples, the display assembly 310 further includes a chassis 318 to provide sufficient rigidity for the touch sensitive layer 312, the display layer 314, and the force sensitive layer 316.

As illustrated in FIG. 3, the portable electronic device 100 further includes a bottom wall 320 and a bottom trim structure 330 that couples together the bottom wall 320 to the enclosure 110. According to some embodiments, the cavity 322 is capable of carrying operational components 324, including a speaker, a processor, a sensor, a piezo transducer, a microphone, and the like.

Figure 4A:
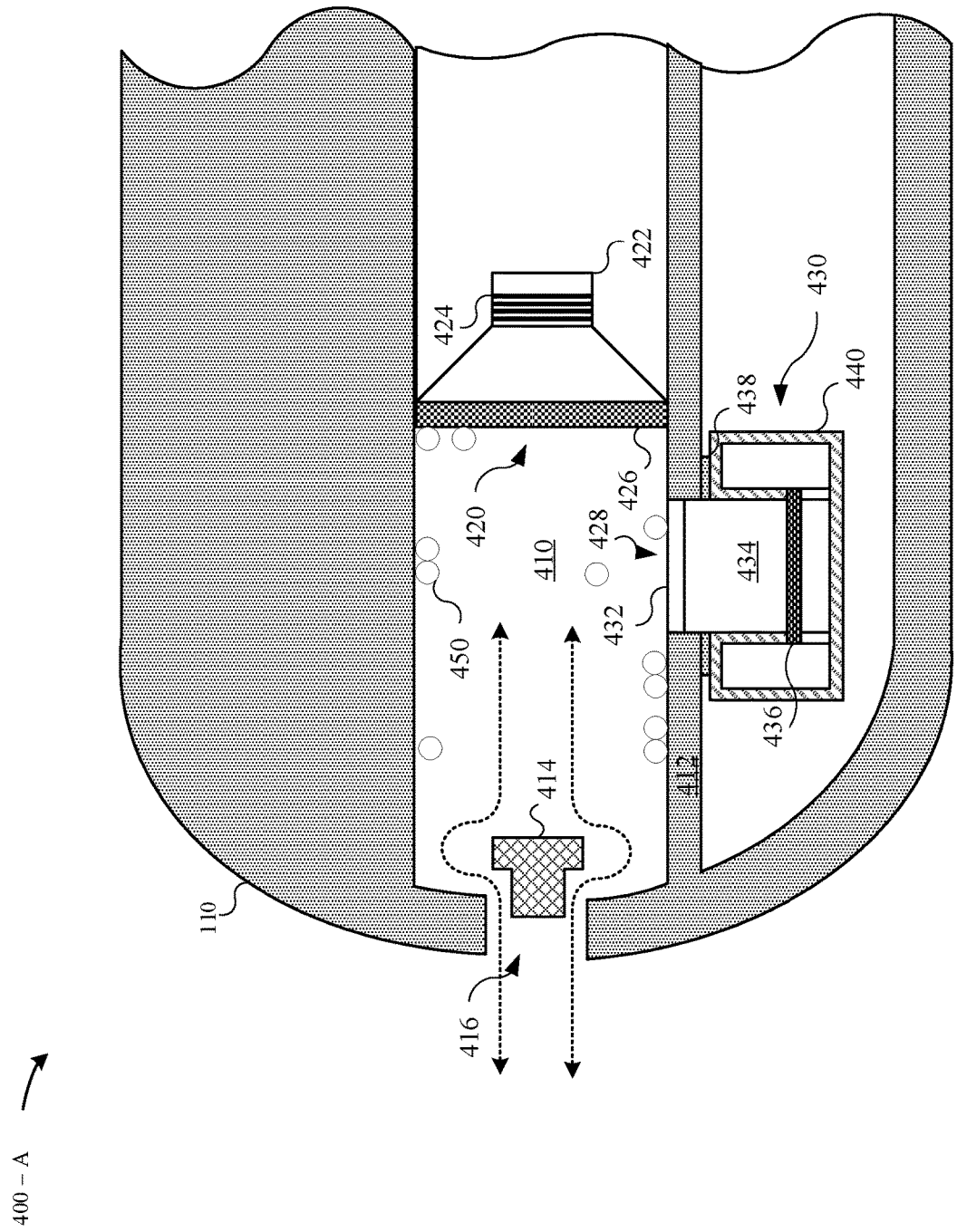
FIGS. 4A-4C illustrate cross-sectional views of a portable electronic device that is configured to implement different aspects of the various techniques described herein, in accordance with some embodiments.
Figure 4B:
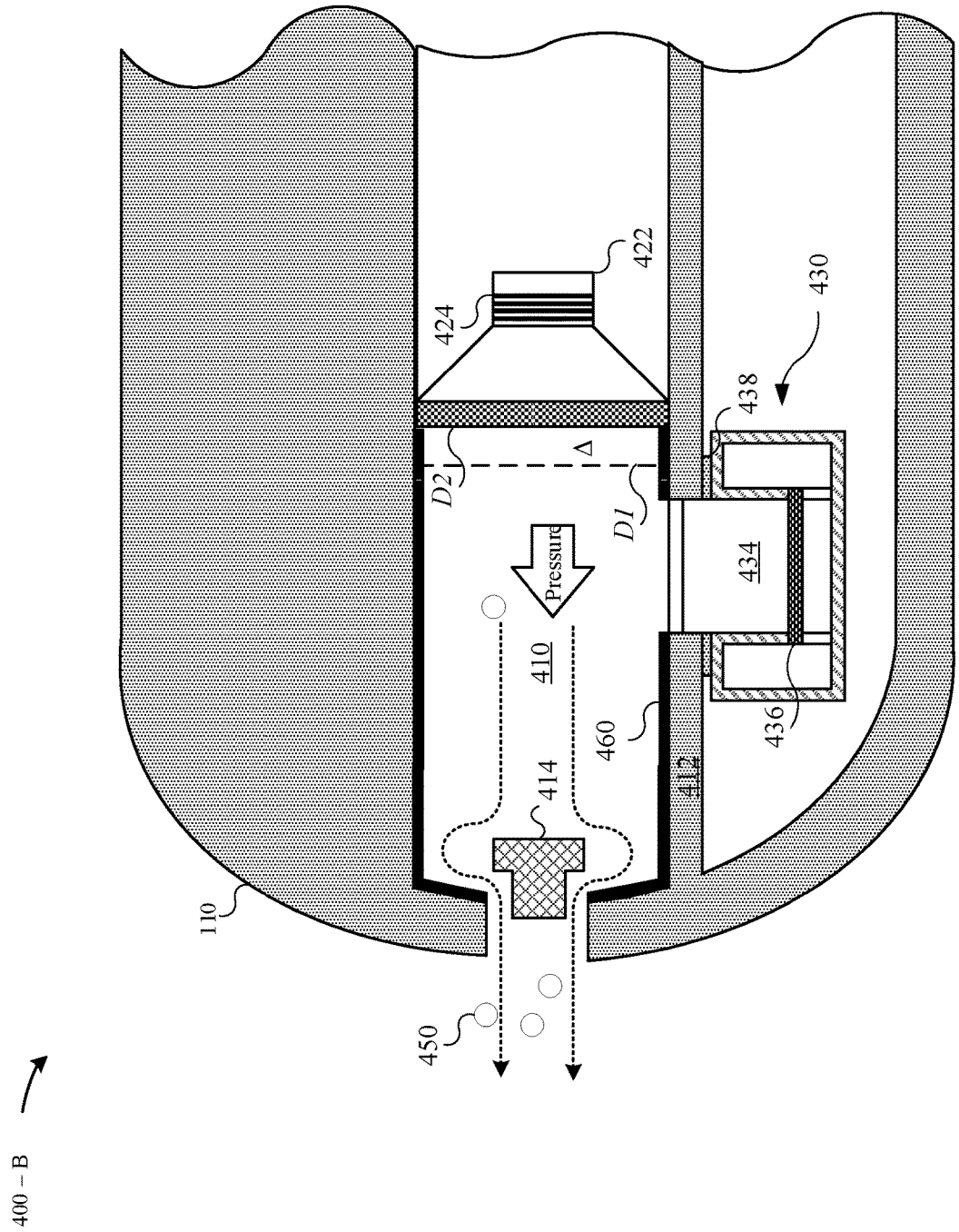
Figure 4C:
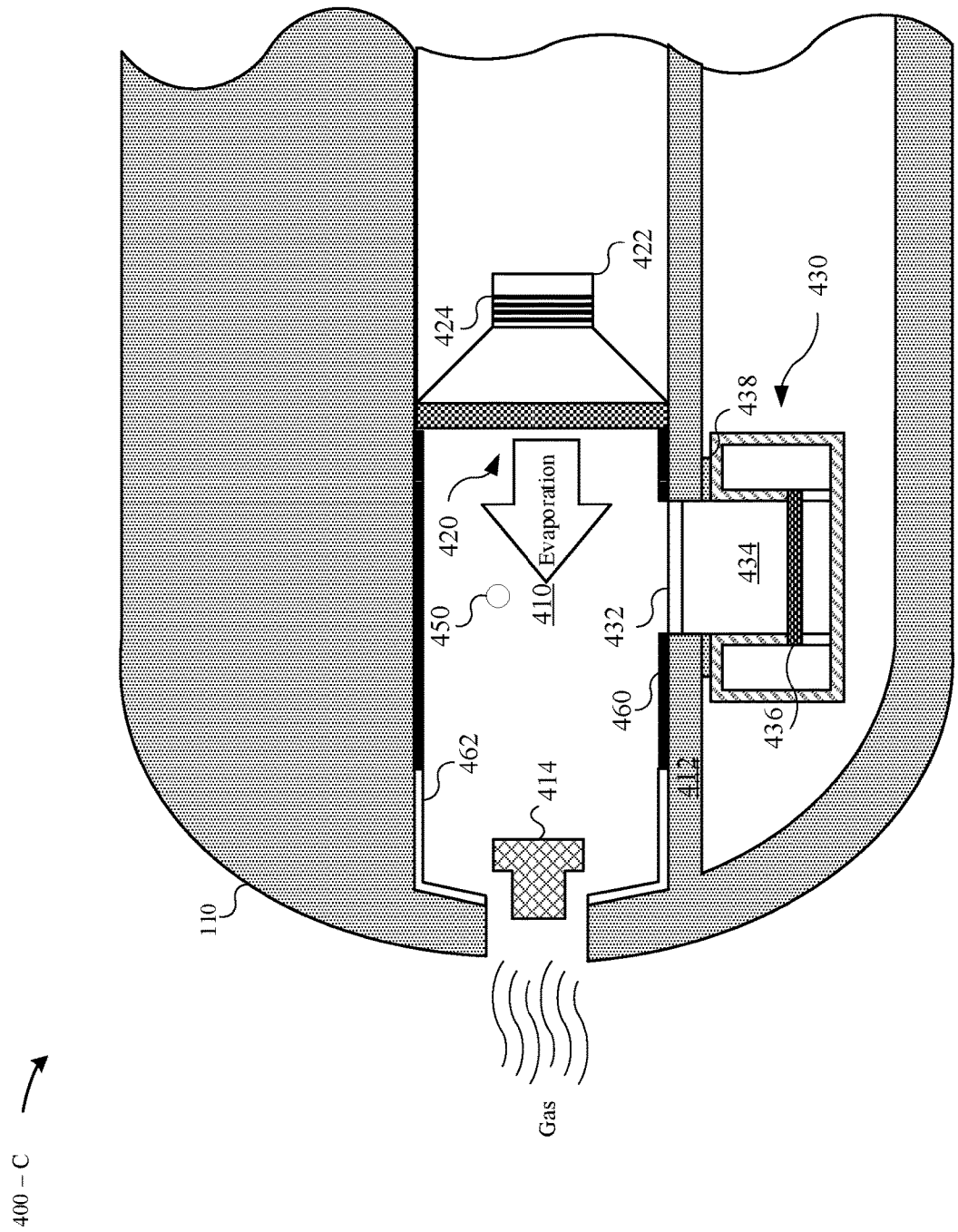

FIGS. 4A-4C illustrate partial cross-sectional views of the portable electronic device 100, in accordance with various embodiments. In particular, FIGS. 4A-4C illustrate the portable electronic device 100 as taken along the reference section B-B of FIG. 3, in accordance with some embodiments. FIG. 4A illustrates the presence of moisture particles 450 within an interior volume 410 of the portable electronic device 100.

FIG. 4A illustrates a moisture removal system 400-A, in accordance with some embodiments. In particular, the moisture removal system 400-A includes a speaker 420 and a sensor module 430. The moisture removal system 400-A combines the speaker 420 and the sensor module 430 in a single interior volume 410, where the interior volume 410 is exposed to a fluid pathway by way of the opening 416. Integrating the sensor module 430 within the same interior volume 410 as the speaker 420 is beneficial in using the speaker 420 to accelerate the removal of moisture particles 450 within the interior volume 410. The speaker 420 may be generally aligned with an opening 416 that is disposed along an external surface of the enclosure 110. The orientation of the speaker 420 and the opening 416 defines an acoustic pathway that includes an amount of air that may be displaced by movement of a diaphragm 426. The movement of the amount of air by the diaphragm 426 results in acoustic energy that may be displaced through the acoustic pathway. The opening 416 may be overlaid with a mesh lining 414 that prevents some moisture particles and/or larger debris from entering the interior volume 410. In some examples, the interior volume is defined as volume between the opening 416, the walls 412, and the diaphragm 426. In some examples, the interior volume is between about 0.2 cc to about 0.5 cc.

The sensor module 430 includes a membrane 432 that is generally affixed between walls 412 that define the interior volume 410. The sensor module 430 may be secured to the walls 412. In some examples, the sensor module 430 includes sides 440 that are secured to the walls 412 with an adhesive 438. The sensor module 430 includes an opening 428 that leads into a pocket 434. The pocket 434 is sealed from the opening 428 by the membrane 432. The membrane 432 may refer to a moisture-impermeable membrane that prevents moisture ingress into the pocket 434. A diaphragm 436 is generally aligned with the opening 428. The diaphragm 436 is capable of flexing in response to air passing through the opening 428. In some embodiments, the pocket 434 has an internal pressure that is different from the interior volume 410, where the sensor module 430 maintains the internal pressure by allowing airflow into the pocket 434 only by way of the opening 428. According to some embodiments, the sensor module 430 includes a transducer that is capable of measuring the amount of flex or deflection of the diaphragm 436 when air enters the pocket 434. Consider, for example, that the sensor module 430 is a barometric pressure sensor that is capable of determining an amount of environmental pressure external to the portable electronic device 100. According to some examples, the sensor module 430 includes a strain gage and is capable of measuring an amount of strain applied against the diaphragm 436. In other examples, the sensor module 430 may be an altimeter.

However, when moisture particles 450 are disposed within an interior volume 410 of the portable electronic device 100, the moisture particles 450 may become adhered to the walls 412, the membrane 432 and/or form over a surface of the diaphragm 426. Indeed, the surface tension associated with moisture pulls additional moisture into the pocket 434. As a result, the moisture particles coming into contact with the diaphragm 436 may bend the diaphragm 436, thereby resulting in accurate sensor readings, such as if the sensor module 430 is a barometric pressure sensor.

Additionally, the presence of moisture may also lead to corrosion of traces in the integrated circuit of the sensor module 430. Indeed, once moisture particles 450 enter the interior volume 410, it may take a considerable amount of time (e.g., days, etc.) for the moisture particles 450 to be removed by evaporation.

As a result, the processor may provide instructions to the speaker 420 to actuate such as to sufficiently remove the moisture particles 450 within the interior volume 410. In particular, the speaker 420 includes a magnetic driver 422 and magnetic coils 424 that generate a variable magnetic field in response to receiving an electrical signal. When an electrical current passes through the magnetic coils 424, the magnetic coils oscillate to generate the variable magnetic field. As the diaphragm 426 is coupled to the magnetic driver 422 with a magnetically active material (e.g., iron, etc.), the varying magnetic field causes the diaphragm 426 to actuate. The magnetic driver 422 may be referred to as a permanent magnet that generates a magnetic field that interacts with the variable magnetic field, thereby causing actuation of the diaphragm 426. The diaphragm 426 generates an alternating pressure. As the diaphragm 426 displaces within the interior volume 410, the moisture particles 450 are forcefully expelled from the interior volume 410 by way of the opening 416. As a result, moisture particles 450 present on the membrane 432 may be forcefully expelled such that the surface of the membrane 432 is generally free of moisture particles 450. Beneficially, this improves the accuracy of the sensor module 430 by removing moisture from the membrane 432. Additionally, any moisture particles 450 present on the surface of the diaphragm 426 of the speaker 420 may also be forcefully removed from the diaphragm 426. It should be noted that the processor selectively controls the actuation of the diaphragm 426 such that no audible acoustic effect is generated while forcefully expelling the moisture particles 450. For example, humans can detect sound at a frequency between 20 Hz to 20 kHz. Thus, the processor may selectively control at least one parameter associated with the actuation of the diaphragm 426 to prevent the diaphragm from generating an audible sound, as will be appreciated by one of ordinary skill in the art. In some examples, the at least one parameter may include a frequency, an amplitude, a waveform, intensity, wavelength, or sound pressure.

According to some embodiments, the interior volume 410 may be referred to as a front volume, where the front volume refers to the volume that is positioned between a diaphragm 426 of the speaker 420 and the opening 416. Additionally, a back volume refers to the volume that is distal of the diaphragm 426 and is generally sealed. The moisture removal system 400-A includes the speaker 420 and the sensor module 430 within the single interior volume 410 so that when the speaker 420 removes moisture particles 450 from the interior volume 410, both of the accuracy of the readings of the sensor module 430 and the acoustic performance of the speaker 420 are improved. Integrating the sensor module 430 within the same interior volume 410 as the speaker 420 is beneficial in using the actuation of the speaker 420 to accelerate the removal of moisture particles 450 within the interior volume 410 and increasing drying time within the interior volume 410.

According to some embodiments, the internal surface(s) of the walls 412 are polished, thereby reducing a coefficient of friction. A low coefficient of friction (e.g., between ~0.05 to 0.5, etc.) of the internal surface(s) causes the moisture particles 450 to be more likely to be expelled from the interior volume 410. For example, moisture particles 450 may be expelled from the opening 416 if the user shakes the portable electronic device 100 in a side-to-side motion. Indeed, polishing the internal surfaces may reduce the number of openings and/or pore structures that would enable moisture particles 450 to be retained therein. In some examples, the internal surfaces are polished with a chemical or mechanical polishing process.

FIG. 4B illustrates a moisture removal system 400-B, in accordance with some embodiments. Similar to the moisture removal system 400-A, the moisture removal system 400-B includes (i) a sensor module 430 disposed within a front volume of the interior volume 410, and (ii) a speaker 420 disposed within a back volume of the interior volume 410. According to some examples, the diaphragm 426 defines the front and back volumes. In contrast to the moisture removal system 400-A, the moisture removal system 400-B includes a hydrophobic coating 460 that coats the surface of the walls 412 that define the interior volume 410. According to some examples, the hydrophobic coating 460 may coat the entire interior surfaces of the walls 412. In other examples, the hydrophobic coating 460 may coat portions of the interior surfaces of the walls 412. The hydrophobic coating 460 may repel water from the walls 412. By lining the walls 412 in proximity to the opening 416, the hydrophobic coating 460 may forcefully drive moisture particles 450 proximally towards the opening 416. In some examples, the hydrophobic coating 460 includes a non-polar molecule, such as polytetrafluoroethylene (PTFE). According to some embodiments, the interior surface(s) of the walls 412 may also be lined with a combination of hydrophobic and hydrophilic coatings, as will be described in greater detail with reference to FIG. 4C.

FIG. 4B illustrates the diaphragm 426 of the speaker 420 being actuated to displace an amount of air through the interior volume. The amount of air is associated with an air pressure that forcefully drives the moisture particles 450 to the opening 416. Indeed, in some examples, the interior volume 410 may be associated with an internal pressure that is greater than a pressure associated with an external environment outside of the portable electronic device 100. In other words, the interior volume 410 is associated with a high-pressure zone and the external environment is associated with a low-pressure zone. As there is a pressure gradient, the amount of air displaced within the interior volume 410 by the diaphragm 426 rushes from the high-pressure zone to the low-pressure zone by way of the opening 416 in an attempt to reach an equilibrium pressure state. FIG. 4B illustrates that the diaphragm 426 actuates between a first position $D_1$ and a second position $D_2$ such as to displace air within the interior volume 410. The diaphragm 526 generates an alternating pressure. The back-and-forth motion of the diaphragm 426 drives air in front of the diaphragm 426, resulting in a pressure differential that forcefully drives the air and the moisture particles 416 out of the interior volume 410. It should be noted that the diaphragm 416 may also convert the moisture particles 416 from a liquid state to a gas state; thereby, removing the moisture particles 416 with evaporation.

FIG. 4C illustrates a moisture removal system 400-C, in accordance with some embodiments. Similar to the moisture removal system 400-A, the moisture removal system 400-C includes (i) a sensor module 430 disposed within a front volume of the interior volume 410, and (ii) a speaker 420 disposed within a back volume of the interior volume 410. According to some examples, the diaphragm 426 defines the front and back volumes. In contrast to the moisture removal system 400-A, the moisture removal system 400-C includes a combination of a hydrophobic coating 460 and a hydrophilic coating 462. The hydrophobic coating 460 may repel water from the walls 412 in regions adjacent to the diaphragm 426. Additionally, the diaphragm may be lined with the hydrophobic coating 460. The hydrophilic coating 462 may be lined in regions of the internal surface(s) of the walls 412 where the presence of moisture particles 416 is less critical to the functionality of the pressure module 430 and/or the speaker 420. For example, FIG. 4C illustrates that the hydrophilic coating 462 is lined in proximity to the opening 416 while the hydrophobic coating 460 is lined in proximity to the pressure module 430 and the speaker 420. In this manner, the hydrophilic coating 462 may attract the moisture particles 450 that are repelled by the hydrophobic coating 460. Beneficially, this steers moisture particles 450 away from more sensitive regions of the interior volume 410.

As illustrated in FIG. 4C, the speaker 420 is capable of evaporating the moisture particles 450. In particular, the magnetic coils 424 may receive an electrical current that causes the magnetic coils 424 to generate an amount of heat energy. In some examples, the amount of heat energy causes the moisture particles 450 to evaporate ~180° C. In some examples, an inaudible frequency spectrum (e.g., >20 kHz) is selected such that the speaker 420 does not generate audible sound while generating the heat energy. As the magnetic coils 424 draw a significant amount of power in order to heat up the magnetic coils 424, the processor may only provide the electrical current to the magnetic coils 424 while the portable electronic device 100 is connected to an external power supply (i.e., being charged).

According to other embodiments, the speaker 420 may also be substituted with a piezoelectric transducer. The piezoelectric transducer may be incorporated in the interior volume 410, where the piezoelectric transducer atomizes the moisture particles 450, thereby converting the moisture particles 450 from a liquid state to a gaseous state to swell out of the opening 416.

According to some embodiments, when the portable electronic device 100 is exposed to a moisture environment (e.g., underwater), moisture particles 450 will enter the interior volume 410 via the opening 416. Consequently, the pressure within the interior volume 410 increases relative to the external moisture environment. However, once the portable electronic device 100 is brought to the surface, then the pressure gradient between the high-pressure zone and the low-pressure zone will reach equilibrium; thereby, causing the pressure within the interior volume 410 to drop. It should be noted that the portable electronic device 100 reaching equilibrium is not sufficient to expel moisture particles 450 from the internal volume 410. In some embodiments, the speaker 420 must generate a sufficient amount of air pressure to overcome an existing amount of pressure within the interior volume 410 in order to remove moisture particles 450. It should be noted the existing amount of pressure within the interior volume 410 is dependent upon the amount of moisture particles 450 present. For example, more moisture particles 450 within the interior volume 410 may correspondingly increase the pressure within the interior volume 410.

Figure 5A:
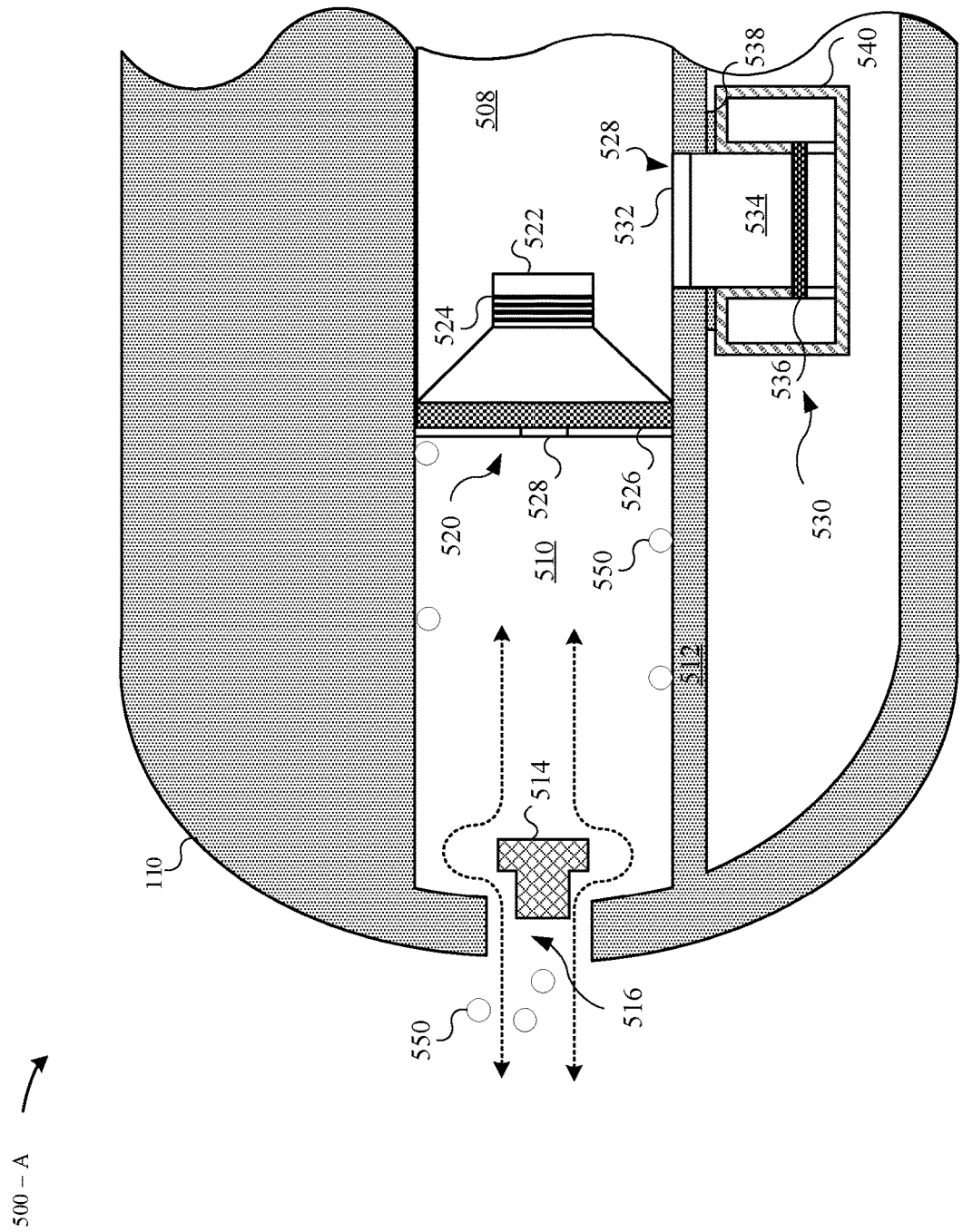
FIGS. 5A-5C illustrate cross-sectional views of a portable electronic device that is configured to implement different aspects of the various techniques described herein, in accordance with some embodiments.
Figure 5B:
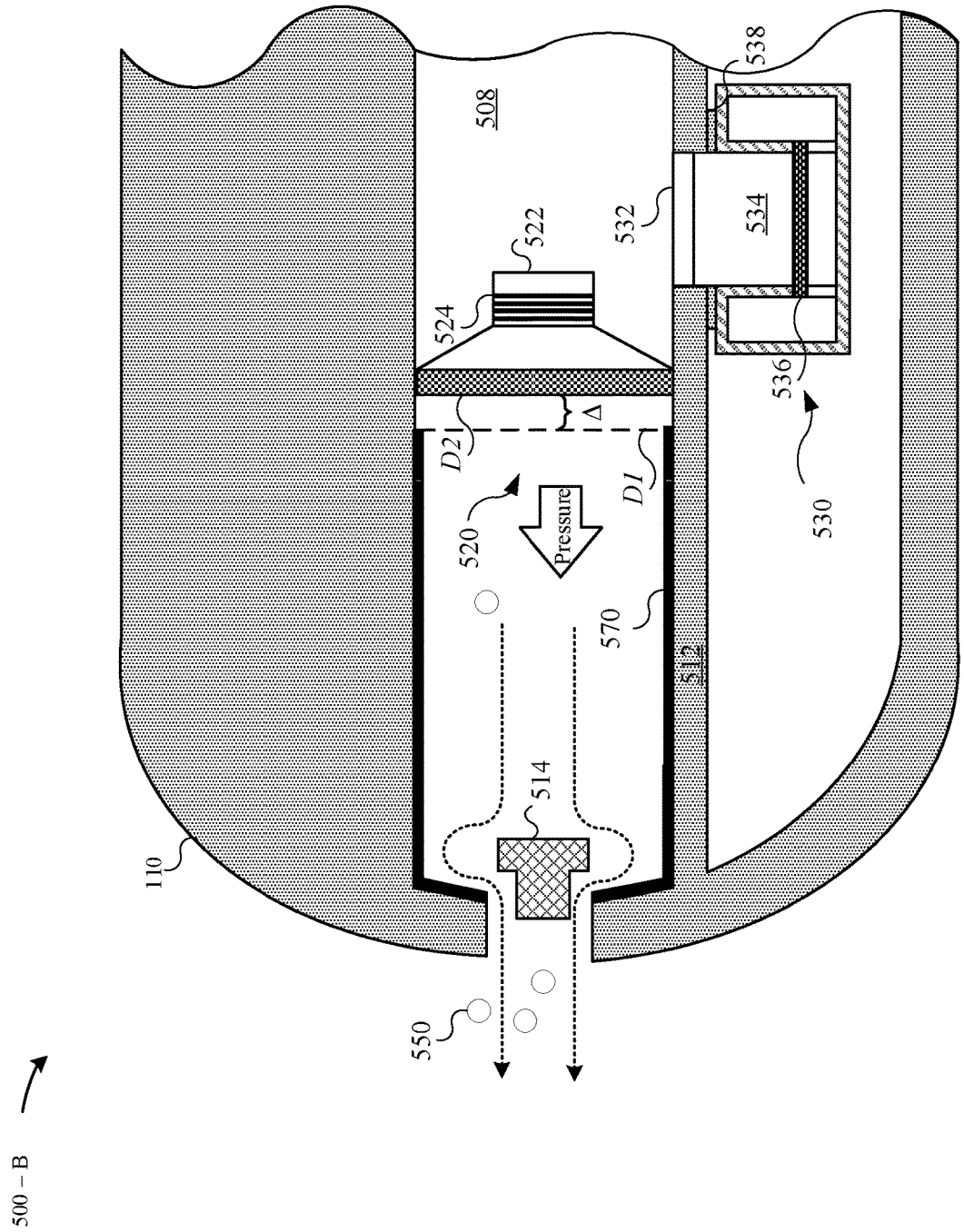
Figure 5C:
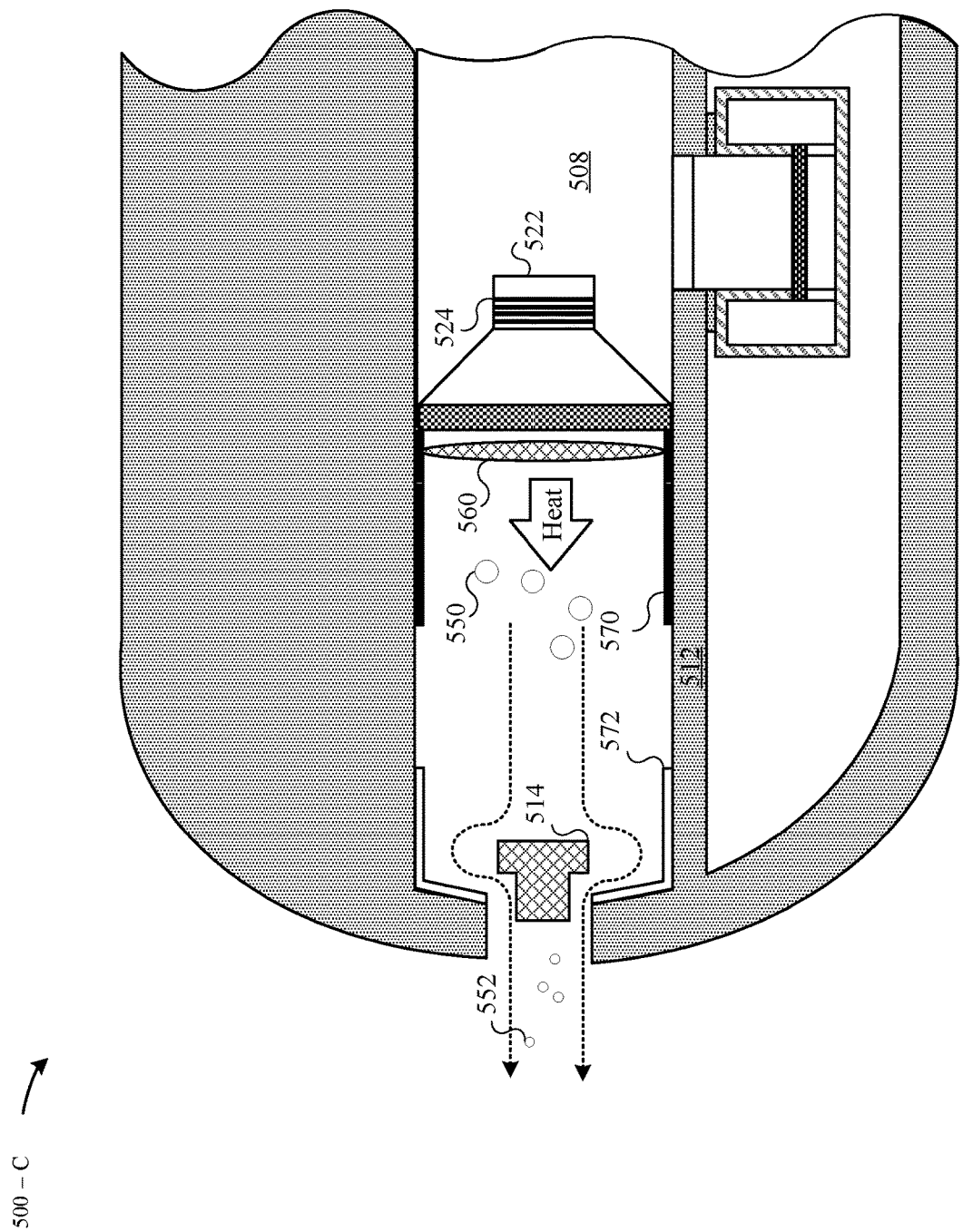

FIGS. 5A-5C illustrate partial cross-sectional views of moisture removal systems of the portable electronic device 100, in accordance with various embodiments. In particular, FIGS. 5A-5C illustrate the portable electronic device 100 as taken along the reference section B-B of FIG. 3, in accordance with some embodiments. FIG. 5A illustrates a moisture removal system 500-A included within the portable electronic device 100. The portable electronic device 100 includes a front volume 510, where the front volume 510 is defined by a diaphragm 526 of the speaker 520 and the opening 516. Additionally, the portable electronic device 100 includes a back volume 508 that is distal of the diaphragm 526. As illustrated in FIG. 5A, both of the speaker 520 and a sensor module 530 are included within the back volume 508. Integrating the sensor module 530 within the speaker 520 in the back volume 508 is beneficial in sealing the speaker 520 and the sensor module 530 from moisture particles 550. In other words, any of the moisture particles 550 that enter by way of the opening 516 cannot enter the back volume 508 due to the diaphragm 526 acting as a physical barrier. Furthermore, the diaphragm 526 may include a membrane 528 that provides an acoustic pathway between the back and front volumes 508, 510. The membrane 528 is generally air permeable and moisture impermeable such that the sensor module 530 is not exposed to the moisture particles 550. The membrane 528 may allow air to pass through and prevents passage of moisture up to an upper pressure threshold. Beneficially, this permits for air to travel through the diaphragm 526 to reach the pressure sensor module 530.

The sensor module 530 includes a membrane 532 that is generally affixed between walls 512. In some examples, the sensor module 530 includes sides 540 that are secured to the walls 512 with an adhesive 538. The sensor module 530 includes an opening 528 that leads into a pocket 534. The pocket 534 is sealed from the opening 528 by the membrane 532. The membrane 532 may refer to a moisture-impermeable membrane that prevents moisture ingress into the pocket 534. The diaphragm 436 is capable of flexing in response to air passing through the opening 428. In some embodiments, the pocket 534 has an internal pressure that is different from the back volume 508, where the sensor module 530 maintains the internal pressure by allowing airflow into the pocket 534 only by way of the opening 528. According to some embodiments, the sensor module 530 includes a transducer that is capable of measuring the amount of flex or deflection of the diaphragm 536 when air enters the pocket 534.

A processor may provide instructions to the speaker 520 to actuate such as to sufficiently remove the moisture particles 550 within the front volume 510. In particular, the speaker 520 includes a magnetic driver 522 and magnetic coils 524 that generate a variable magnetic field in response to receiving an electrical signal. As the diaphragm 526 displaces within the front volume 510, the moisture particles 550 are forcefully expelled from the interior volume 510 by way of the opening 516. Additionally, any moisture particles 550 present on the surface of the diaphragm 526 of the speaker 520 may also be forcefully removed. It should be noted that the processor selectively controls the actuation of the diaphragm 526 such that no audible acoustic effect is generated while forcefully expelling the moisture particles 550. The processor may selectively control at least one parameter associated with the actuation of the diaphragm 526 to prevent the diaphragm from generating an audible sound, as will be appreciated by one of ordinary skill in the art. In some examples, the at least one parameter may include a frequency, an amplitude, a waveform, intensity, wavelength, or sound pressure.

FIG. 5B illustrates a moisture removal system 500-B, in accordance with some embodiments. Similar to the moisture removal system 500-A, the moisture removal system 400-B includes a speaker 520 and a sensor module 530 disposed within a back volume 508. In contrast to the moisture removal system 500-A, the moisture removal system 500-B includes a hydrophobic coating 460 that coats the surface of the walls 512. The hydrophobic coating 570 may repel water from the walls 512. By lining the walls 512 of the front volume 510, the hydrophobic coating 570 may forcefully drive moisture particles 550 proximally towards the opening 516.

FIG. 5B illustrates the diaphragm 526 of the speaker 520 being actuated to displace an amount of air through the front volume 510. The amount of air is associated with an air pressure that forcefully drives the moisture particles 550 to the opening 516. Indeed, in some examples, the front volume 510 may be associated with an internal pressure that is greater than a pressure associated with an external environment outside of the portable electronic device 100. In other words, the front volume 510 is associated with a high-pressure zone and the external environment is associated with a low-pressure zone. As there is a pressure gradient, the amount of air displaced within the front volume 510 by the diaphragm 526 rushes from the high-pressure zone to the low-pressure zone by way of the opening 516 in an attempt to reach an equilibrium pressure state. FIG. 4B illustrates that the diaphragm 526 actuates between a first position $D_1$ and a second position $D_2$ such as to displace air within the front volume 510.

FIG. 5C illustrates a moisture removal system 500-C, in accordance with some embodiments. As illustrated in FIG. 5C, the magnetic coils 524 are capable of generating sufficient heat to evaporate the moisture particles 550 into evaporated moisture 552, which is capable of swelling as a gas through the opening 516.

In contrast to the moisture removal system 500-B, the moisture removal system 500-C includes a combination of a hydrophobic coating 570 and a hydrophilic coating 572. The moisture removal system 500-C further includes an acoustic mesh barrier 560 that prevents metallic particles from entering the speaker 530 by way of the front volume 510. In particular, the metallic particles may interfere with the magnetic driver 522 of the speaker 530, as the magnetic driver includes a magnet. However, when the portable electronic device 100 is exposed to saltwater, e.g., during a surfing session in Santa Cruz, the saltwater crystals may leave a residue on the acoustic mesh barrier 560 when the saltwater evaporates. Accordingly, the diaphragm 526 may be actuated to sufficiently remove the saltwater crystals from the acoustic mesh barrier 560. Furthermore, the processor may in communication with a sensor that is capable of detecting the presence of saltwater crystals on the acoustic mesh barrier 560.

According to some embodiments, the opening 516 may be overlaid with a mesh lining 514 that prevents some moisture particles 550 and/or larger debris from entering the front volume 510. Furthermore, the acoustic mesh barrier 560 prevents metallic particles from entering the back volume 508. However, both of the mesh lining 514 and the acoustic mesh barrier 560 are associated with a respective amount of resistance (i.e., resistance threshold), which the speaker 530 must overcome in order to expel the moisture particles 550 past the acoustic mesh barrier 560 and the mesh lining 540 to reach the opening 516.

Figure 6:
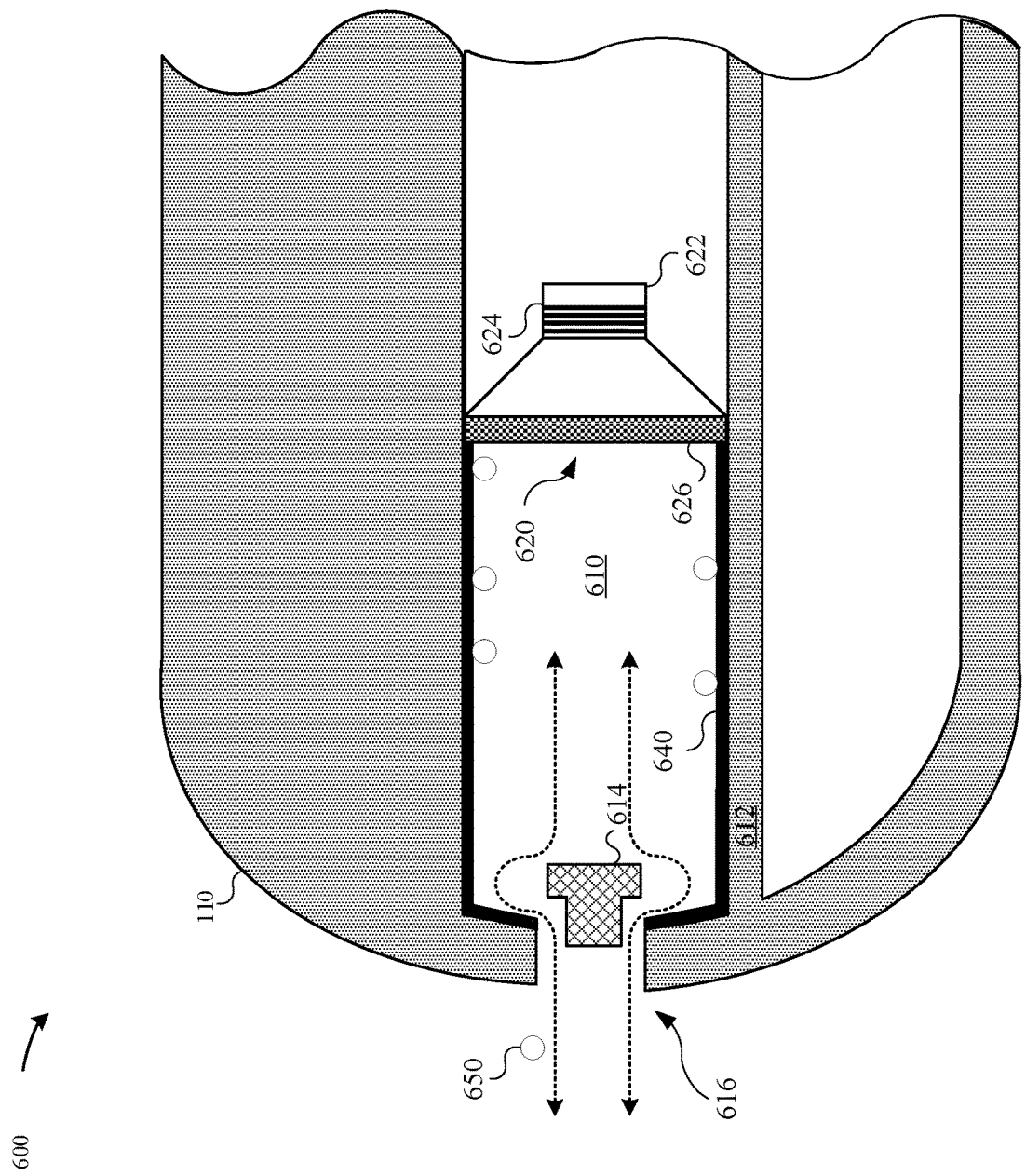
FIG. 6 illustrates a cross-sectional view of a portable electronic device that is configured to implement different aspects of the various techniques described herein, in accordance with some embodiments.

FIG. 6 illustrates a partial cross-sectional view of a moisture removal system 600, in accordance with some embodiments. In particular, the moisture removal system 600 includes a speaker 620 that is disposed within an internal volume 610. In contrast to the moisture removal systems 400-A-C and 500-A-C, the moisture removal system 600 does not include a sensor module—e.g., the sensor module 430.

The interior volume 610 is exposed to a fluid pathway by way of the opening 616. The speaker 620 is generally aligned with the opening 416. The orientation of the speaker 620 and the opening 616 defines an acoustic pathway that includes an amount of air that may be displaced by movement of a diaphragm 626. The movement of the amount of air by the diaphragm 626 results in acoustic energy that may be displaced through the acoustic pathway. The opening 616 may be overlaid with a mesh lining 614 that prevents larger debris from entering the interior volume 610. The interior volume 610 may be defined by sides 640.

When moisture particles 650 enter the interior volume 610, the moisture particles 650 may become adhered to surface(s) of the walls 612. The presence of these moisture particles 650 may negatively affect the acoustic pathway in the interior volume 610. Indeed, the walls 612 may be relied upon to deflect acoustic energy that is generated by the speaker 620 towards the opening 616. However, if the moisture particles 650 are adhered to the walls 612, then the acoustic energy is muffled. Additionally, the moisture particles 650 may be adhered to a surface of the diaphragm 626, which also affects the frequency and/or waveform of the acoustic energy generated by the speaker 620. As a result, the processor may provide instructions to the speaker 620 to actuate such as to sufficiently remove the moisture particles 650 within the interior volume 610. In particular, the speaker 620 includes a magnetic driver 622 and magnetic coils 624 that generate a variable magnetic field in response to receiving an electrical signal. The varying magnetic field causes the diaphragm 626 to actuate. As the diaphragm 626 displaces within the interior volume 610, the moisture particles 650 are forcefully expelled from the interior volume 610 by way of the opening 616. According to some embodiments, the diaphragm 626 is actuated such as to generate an amount of air pressure within the interior volume 610 that displaces the moisture particles 650. In other embodiments, the magnetic coils 624 are heated up to cause evaporation of the moisture particles 650.

It should be noted that the processor selectively controls the actuation of the diaphragm 626 such that no audible acoustic effect is generated while forcefully expelling the moisture particles 650 according to any of the techniques described herein. For example, humans can detect sound at a frequency between 20 Hz to 20 kHz. Thus, the processor may selectively control at least one parameter associated with the actuation of the diaphragm 626 to prevent the diaphragm from generating an audible sound, as will be appreciated by one of ordinary skill in the art. In some examples, the at least one parameter may include a frequency, an amplitude, a waveform, intensity, wavelength, or sound pressure.

According to some embodiments, the internal surface(s) of the walls 612 may be polished, thereby reducing a coefficient of friction. Additionally, the internal surface(s) of the walls 612 may include a combination of a hydrophobic coating and/or a hydrophilic coating.

Figure 7:
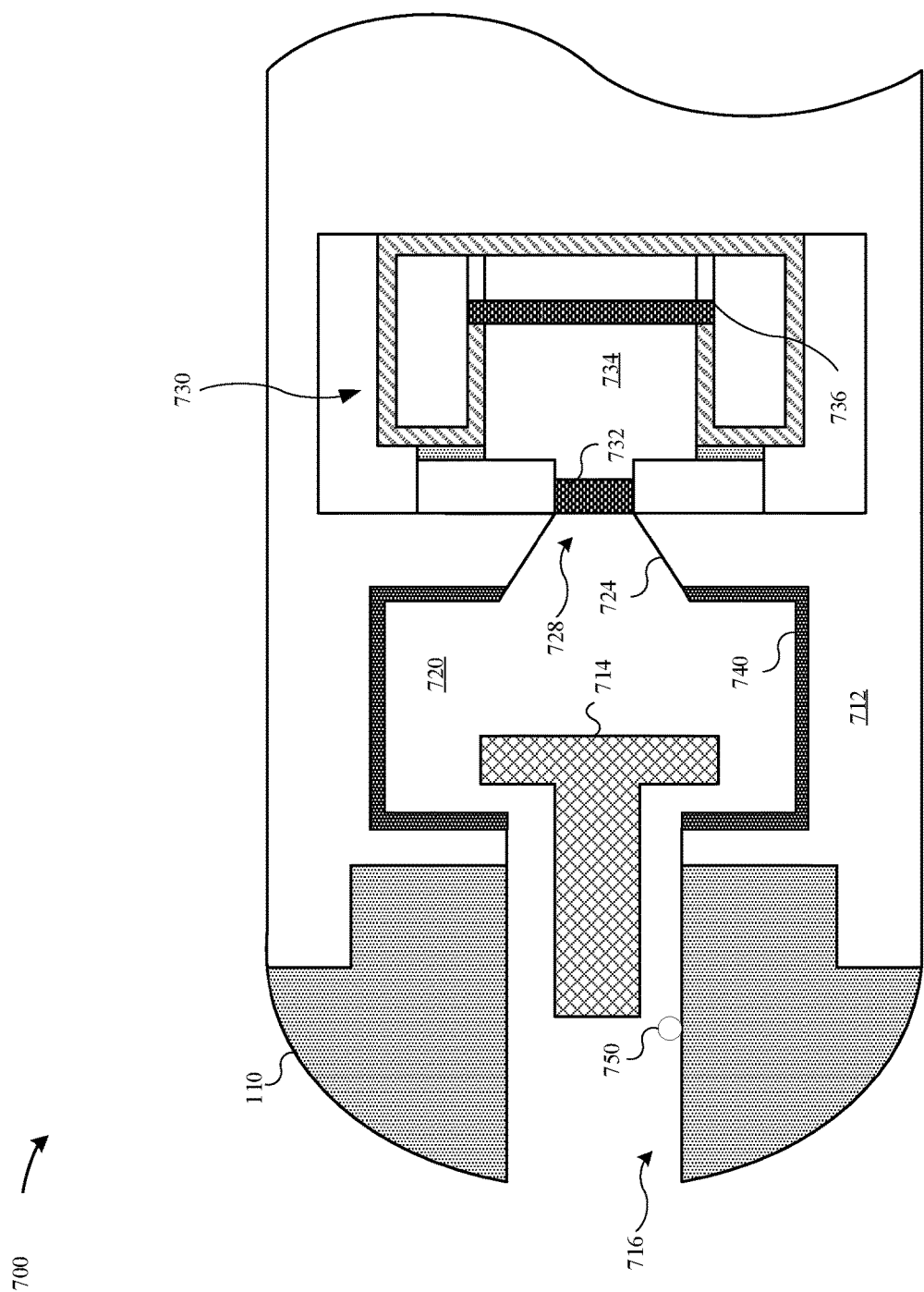
FIG. 7 illustrates a cross-sectional view of a portable electronic device that is configured to implement different aspects of the various techniques described herein, in accordance with some embodiments.

FIG. 7 illustrates a cross-sectional view of a moisture removal system of a portable electronic device, in accordance with some embodiments. In particular, FIG. 7 illustrates the portable electronic device 100 taken along the reference section B-B of FIG. 3, in accordance with some embodiments. FIG. 7 illustrates a moisture removal system 700 included within the portable electronic device 100.

FIG. 7 illustrates the enclosure 110 includes walls 712 that define an interior volume 720. At an external surface of the enclosure 110 is an opening 716 that defines a fluid pathway from an environment external to the portable electronic device 100 and the interior volume 720. The interior volume 720 may be defined by sides 740. As illustrated in FIG. 7, the fluid pathway extends from the interior volume 720 into the sensor module 730. According to some embodiments, the opening 716 may be overlaid with a mesh lining 714.

The sensor module 730 includes a membrane 732 that is generally affixed between walls 712 that define the interior volume 720. The sensor module 730 includes an opening 728 that leads into a pocket 734. The pocket 734 is sealed from the opening 728 by the membrane 732. A diaphragm 736 is generally aligned with the opening 728. The diaphragm 736 is capable of flexing in response to air passing through the opening 728. According to some embodiments, the sensor module 730 includes a transducer that is capable of measuring the amount of flex or deflection of the diaphragm 736 when air enters the pocket 734. Consider, for example, that the sensor module 730 is a barometric pressure sensor that is capable of determining an amount of environmental pressure external to the portable electronic device 100. According to some examples, the sensor module 730 includes a strain gage and is capable of measuring an amount of strain applied against the diaphragm 736.

In contrast to the moisture removal systems 400-A-C, 500-A-C, the moisture removal system 700 does not include a speaker—e.g., the speaker 420—that is capable of displacing an amount of air within the interior volume 720 to remove moisture particles 750 from the interior volume 720. Instead the moisture removal system 700 relies upon preventing and/or minimizing the moisture particles 750 from residing along the walls 712 and/or the surface of the membrane 732. For example, the internal volume 720 is less than corresponding interior volumes—e.g., interior volume 410, 510—thereby reducing the probability of moisture particles 750 occluding the interior volume 720. Furthermore, the moisture removal system 700 includes a bracket 724 that defines the opening 728 into the sensor module 730. The bracket 724 is set at an angle other than 90° (or other than perpendicular) between the membrane 732 and the walls 712. Beneficially, the bracket 724 facilitates in porting moisture particles 750 out of the interior volume 720. According to some examples, the internal surface(s) of the walls 712 and/or bracket 724 may be polished so as to reduce the coefficient of friction. Furthermore, the internal surface(s) of the walls and/or bracket 724 may be coated with a combination of a hydrophobic and/or hydrophilic coating.

It should be noted that any one of the features of any one of the moisture removal systems described herein may be included in combination with any of the other features described herein.

Figure 8:
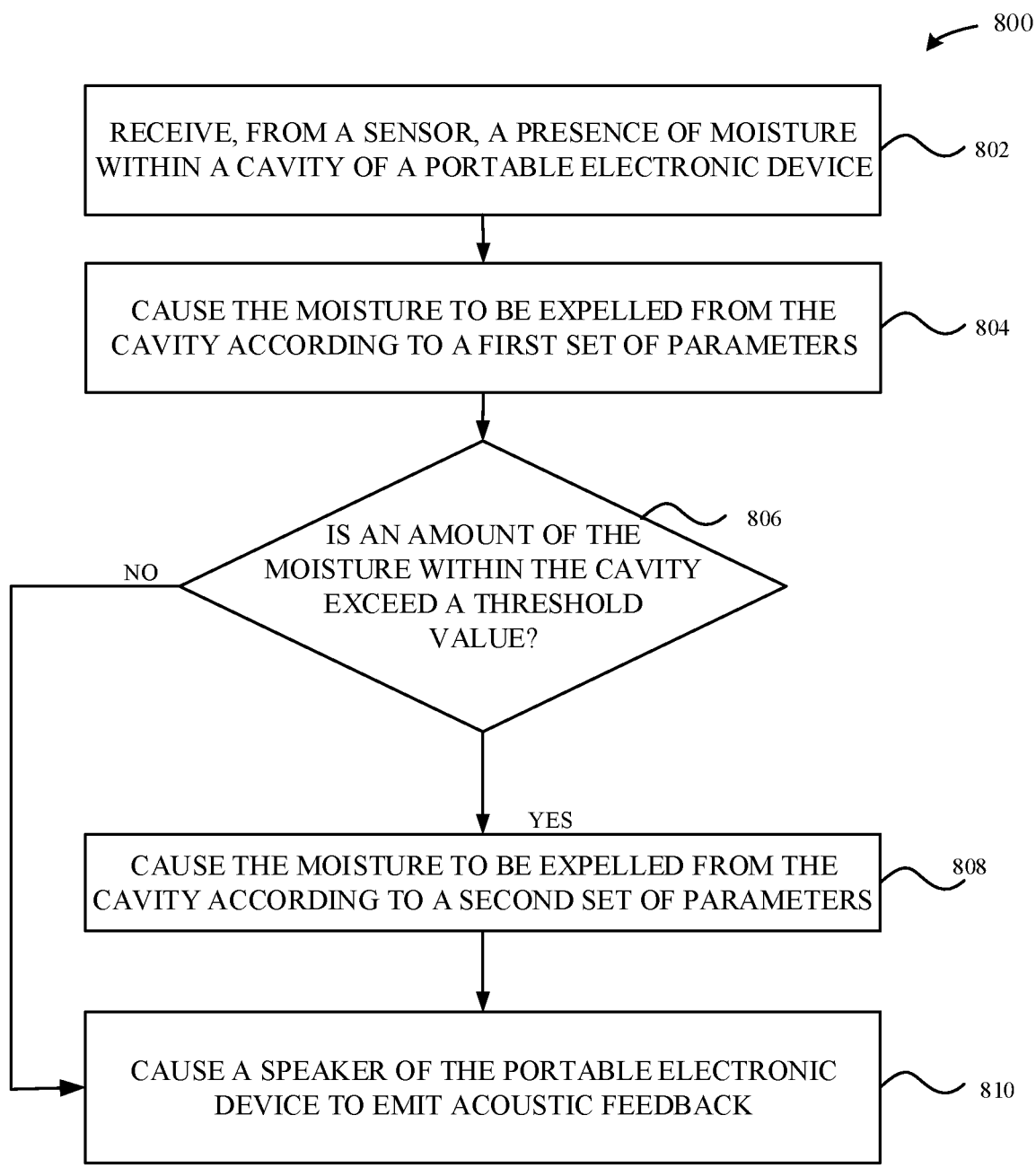
FIG. 8 illustrates a flowchart for removing moisture from a portable electronic device, in accordance with some embodiments.

FIG. 8 illustrates a flowchart of a method 800 for removing moisture particles from an internal cavity of a portable electronic device, in accordance with some embodiments. As illustrated in FIG. 8, the method begins at step 802, where a processor—e.g., the main logic board—receives, from a sensor (e.g., a moisture sensor), that moisture is present within a cavity of the portable electronic device. At step 804, the processor may cause the moisture to be expelled from the cavity according to a first set of parameters. According to some examples, the first set of parameters are associated with velocity, acceleration, amplitude, frequency, waveform, etc. as related to generating an amount of air pressure to displace the moisture particles and/or generating a sufficient amount of heat to evaporate the moisture particles. In some examples, the parameters may be referred to as moisture parameters or moisture expulsion parameters.

At step 806, the processor may determine whether the amount of moisture present within the cavity exceeds a moisture threshold value. At step 808, if the amount of moisture present within the cavity exceeds the moisture threshold value, then the processor may provide instructions to the moisture removal system to expel moisture from the cavity according to a second set of parameters. In some examples, the second set of parameters are equivalent and/or different from the first set of parameters.

Alternatively, at step 810, if the processor determines that the amount of moisture present within the cavity is less than or equal to the moisture threshold value, then the processor may cause a speaker—e.g., the speaker 420—to emit an acoustic feedback. It should be noted that the acoustic feedback generated by the speaker 420 is intended to be perceived and heard by a user. As such, the acoustic feedback may have a frequency between about 20 Hz to about 20 kHz. In contrast, when the speaker 420 expels the moisture from the cavity, the speaker 420 may have an inaudible frequency—i.e., x<20 Hz or x>20 kHz.

Figure 9:
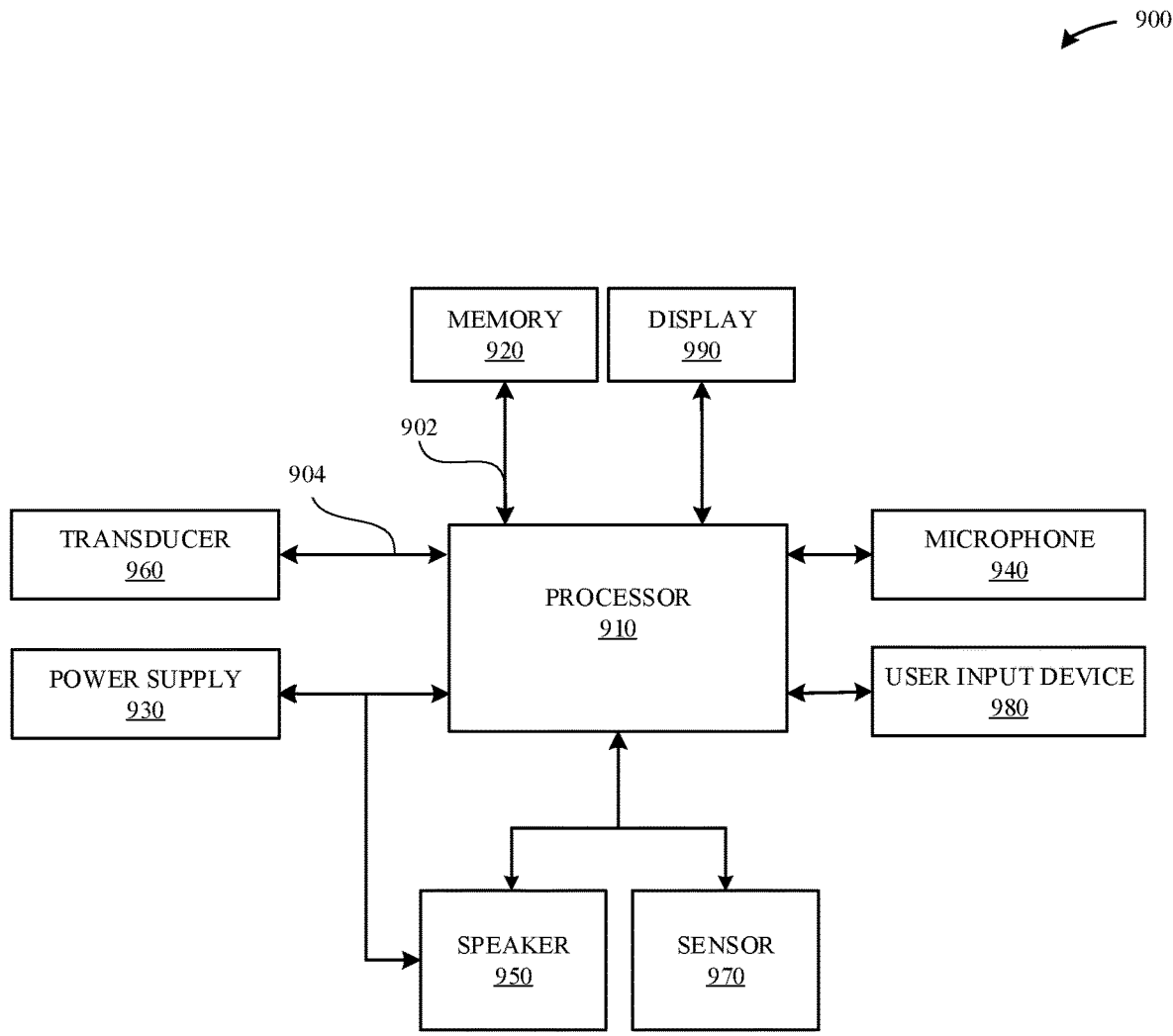
FIG. 9 illustrate a block diagram of a portable electronic device that is configured to implement different aspects of the various techniques described herein, in accordance with some embodiments.

FIG. 9 illustrates a block diagram of a portable electronic device 900 configured to implement the various techniques described herein, according to some embodiments. In particular, the detailed view illustrates various components that can be included in the portable electronic device 100 as illustrated in FIG. 1. As shown in FIG. 9, the portable electronic device 900 can include a processor 910 for controlling the overall operation of the portable electronic device 900. According to some examples, the processor 910 refers to the main logic board described herein. The portable electronic device 900 includes a display 990. The display 990 can be a touch screen panel that can include a sensor (e.g., capacitance sensor). The display 990 may be controlled by the processor 910 to display information to the user. A data bus 902 can facilitate data transfer between at least a memory 920 and the processor 910. The portable electronic device 900 can also include a connector 904 that couples a piezo transducer 960 to the processor 910. The portable electronic device 900 can include a power supply 930 (e.g., battery).

The portable electronic device 900 includes a user input device 980, such as a switch. The user input device 980 can refer to a solid state switch relay that can be configured to detect a change in capacitance when a user's appendage makes contact with the user input device 980.

In some embodiments, the portable electronic device 900 includes a speaker 950 configured to remove moisture, particles, debris, etc. from an internal cavity based on parameters that are generated by the processor 910. In some examples, the processor is in communication with a sensor 970. The sensor 970 is capable of determining a presence of moisture, debris, crystal (e.g., saltwater crystals, etc. In response, the sensor 970 provides a detection signal to the processor 910. The processor 910 may generate parameters based on the detection signal, such as an intensity of the detection signal. In one example, the sensor 970 is a strain gage that is capable of measuring an amount of strain caused by moisture particles flexing against a transducer. As a result, the sensor 970 provides a signal that indicates a strength and/or amount of strain exerted by the moisture particles. The processor 910, the sensor 970, and the speaker 950 may establish a closed loop feedback system (or feedback control system). Additionally, the portable electronic device 900 includes a microphone 940. The microphone 940 may also be included within the closed loop feedback system, where the microphone 940 is used as a type of sensor to determine whether an acoustic effect of the speaker 950 is presently impacted by moisture, and as a result, cause the processor 910 to provide parameters to expel moisture from the speaker 950.

The portable electronic device 900 also includes a memory 920, which can comprise a single disk or multiple disks (e.g., hard drives), and includes a storage management module that manages one or more partitions within the memory 920. In some embodiments, the memory 920 can include flash memory, semiconductor (solid state) memory or the like. The portable electronic device 900 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 900.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

Any ranges cited herein are inclusive. The terms "substantially", "generally," and "about" used herein are used to describe and account for small fluctuations. For example, they can refer to less than or equal to ±5%, such as less than or equal to ±2%, such as less than or equal to ±1%, such as less than or equal to ±0.5%.

As described above, one aspect of the present technology is the gathering and use of data available from various sources to improve the delivery to users of personal content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable electronic device, comprising:
   a housing having walls that define a cavity, wherein the housing is capable of carrying operational components within the cavity that include:
   a processor capable of providing instructions; and
   a moisture removal system in communication with the processor, the moisture removal system including:
      a sensor capable of (i) detecting an amount of moisture within the cavity, and (ii) generating a moisture parameter based on the detected amount of moisture,
      a magnetic coil element capable of generating a magnetic field in response to receiving the instructions from the processor,
      a diaphragm that is capable of actuating in response to the magnetic field being generated by the magnetic coil element, and
      an opening disposed at an external surface of the housing, wherein the opening defines a passage such that when moisture is present within the cavity, the magnetic coil element receives the instructions from the processor to generate the magnetic field that causes the diaphragm to actuate so as to remove at least some of the moisture within the cavity via the passage.

2. The portable electronic device of claim 1, wherein the magnetic field generated by the magnetic coil element is based on the detected amount of moisture.

3. The portable electronic device of claim 1, further comprising:
   an environmental sensor capable of generating an environmental parameter, wherein an accuracy of the environmental parameter is affected by the amount of moisture within the cavity.

4. The portable electronic device of claim 1, wherein the sensor is a barometric pressure sensor, an altimeter or a strain gage.

5. The portable electronic device of claim 1, wherein the diaphragm is a semi-rigid membrane.

6. The portable electronic device of claim 1, further comprising:
   an acoustic mesh barrier that separates the diaphragm from the magnetic coil element.

7. The portable electronic device of claim 1, wherein the opening is aligned with the diaphragm.

8. The portable electronic device of claim 1, wherein the diaphragm includes an air—permeable membrane that is capable of preventing the moisture from reaching the magnetic coil element.

9. A sensor assembly comprising:
   a frame coupled to a housing of a portable electronic device, the housing having an external opening at an external surface, the external opening in communication with an internal opening at an internal surface by way of a through-hole, the internal surface defining, at least in part, an internal cavity, the frame includes walls (i) that define a sensor cavity separate from the internal cavity, and (ii) that carry a moisture impermeable membrane between the sensor cavity and the internal cavity; and
   a sensor module within the sensor cavity capable of (i) detecting an amount of moisture in contact with the moisture impermeable membrane, the amount of moisture corresponding to an amount of moisture within the internal volume, and (ii) generating an environmental parameter based on the detected amount of moisture.

10. The sensor assembly of claim 9, wherein the portable electronic device includes:
    a processor in communication with the sensor module that (i) receives the environmental parameter and (ii) generates an instruction in accordance therewith, and
    a moisture expelling element in communication with the processor that uses the instruction from the processor to expel moisture from the internal cavity.

11. The sensor assembly of claim 10, wherein the moisture expelling element is a hydrophobic layer.

12. The sensor assembly of claim 9, wherein the sensor module is a barometric pressure sensor.

13. The sensor assembly of claim 9, further comprising:
    a mesh lining that covers the external opening.

14. The sensor assembly of claim 10, wherein the moisture is expelled from the internal cavity by way of the through-hole.

15. The sensor assembly of claim 10, wherein the moisture expelling element is a speaker assembly having a transducer element driven by a magnetic coil, the transducer element providing an inaudible acoustic energy capable of causing at least some of the amount of moisture into the through-hole at the internal opening and out of the through-hole at the external opening.

16. A portable electronic device, comprising:
    a housing having walls that define a cavity, wherein an external surface of at least one of the walls includes an opening that extends into the cavity, and the walls are capable of carrying operational components within the cavity that include:
    a processor capable of providing instructions,
    a sensor in communication with the processor, wherein the sensor is capable of (i) determining moisture within the cavity, and (ii) providing a corresponding detection signal to the processor, and
    a speaker assembly in communication with the processor, the speaker assembly including a magnetic coil capable of generating a variable magnetic field in response to receiving the instructions from the processor that are based on the corresponding detection signal, wherein the variable magnetic field removes at least some of the moisture within the cavity by way of the opening.

17. The portable electronic device of claim 16, further comprising:
a speaker diaphragm coupled to the magnetic coil, wherein the speaker diaphragm separates the cavity into first and second cavities.

18. The portable electronic device of claim 17, further comprising:
an acoustic mesh barrier that prevents metallic particles within the first cavity from reaching the second cavity.

19. The portable electronic device of claim 16, wherein the magnetic coil generates an amount of heat that is sufficient to evaporate the moisture within the cavity.

20. The portable electronic device of claim 16, further comprising:
a mesh lining that covers the opening.

* * * * *